United States Patent
Oneda et al.

(10) Patent No.: US 8,425,215 B2
(45) Date of Patent: Apr. 23, 2013

(54) POWDER COMPRESSION MOLDING MACHINE

(75) Inventors: Yoshitsugu Oneda, Kyoto (JP); Kunihiky Tsutsui, Kyoto (JP)

(73) Assignee: Kikusui Seisakusho Ltd., Kyoto (JP)

( * ) Notice: Subject to any disclaimer, the term of this patent is extended or adjusted under 35 U.S.C. 154(b) by 0 days.

(21) Appl. No.: 13/137,968

(22) Filed: Sep. 22, 2011

(65) Prior Publication Data
US 2012/0082743 A1  Apr. 5, 2012

(30) Foreign Application Priority Data

Oct. 5, 2010  (JP) ............... P2010-225697

(51) Int. Cl.
*B29C 43/56*  (2006.01)

(52) U.S. Cl.
USPC .......... 425/107; 425/90; 425/98; 425/92

(58) Field of Classification Search ......... 425/107, 425/90, 98, 92
See application file for complete search history.

(56) References Cited

U.S. PATENT DOCUMENTS

| | | | | |
|---|---|---|---|---|
| 2,475,702 A | * | 7/1949 | Funke | 210/422 |
| 3,721,265 A | * | 3/1973 | Hoffland | 137/625.47 |
| 6,616,437 B1 | * | 9/2003 | Neubauer | 425/133.1 |
| 2004/0083872 A1 | * | 5/2004 | Watanabe et al. | 83/684 |
| 2008/0258343 A1 | * | 10/2008 | Tado et al. | 264/338 |
| 2009/0304836 A1 | | 12/2009 | Oneda et al. | |

FOREIGN PATENT DOCUMENTS

JP  2010-017765 A  1/2010

* cited by examiner

*Primary Examiner* — Joseph Del Sole
*Assistant Examiner* — Kimberly A Stewart
(74) *Attorney, Agent, or Firm* — McGinn IP Law Group, PLLC

(57) ABSTRACT

A powder compression molding machine includes a downward spray portion that sprays a lubricant toward an inner circumferential surface of a die bore and a tip face of a tip of a lower punch, an upward spray portion that sprays the lubricant toward a tip face of the tip of the upper punch, a first lubricant flow passage through which the lubricant supplied from a lubricant supply device externally provided is fed to the downward spray portion, and a second lubricant flow passage through which the lubricant supplied from the lubricant supply device externally provided is fed to the upward spray portion. A small-diameter region of which an inner diameter is made smaller than that of the first lubricant flow passage is provided at a part of the second lubricant flow passage.

14 Claims, 16 Drawing Sheets

POWDER COMPRESSION MOLDING MACHINE

BACKGROUND OF THE INVENTION

1. Field of the Invention

The present invention relates to a powder compression molding machine that compresses a powdery material to mold a medical tablet, food, an electronic component, and the like.

2. Description of the Related Art

A publicly known powder compression molding machine is provided with die bores vertically penetrating through a table, and upper and lower punches slidably held in a vertical direction above and below each of the die bores. The table and the punches are horizontally rotated together, and the upper punch and the lower punch compress a raw powdery material filled in the die bores and mold tablets when the upper punch and the lower punch pass through between upper and lower rolls.

When a product is produced using such a powder compression molding machine, there is sometimes caused binding in which a raw powdery material sticks to an inner circumferential surface of the die bore, or sticking in which the raw powdery material sticks to a tip of a punch. All of these cause flaws, roughness, chipping of the product. To prevent this kind of trouble from occurring, a powder lubricant such as metal stearate and talc is spray-coated on the inner circumferential surface of the die bore and the tip of the punch in advance, and thereafter the raw powdery material is filled in the die bore to be tabletted (see, for example, Japanese Patent Application Laid-Open as No. 2010-017765).

A spray device for spraying the lubricant is divided into a downward spray portion for spraying the lubricant toward the inner circumferential surface of the die bore and the tip of the lower punch, and an upward spray portion for spraying the lubricant toward the tip of the upper punch. Both of the spray portions are provided with a DC high-voltage electrode in the vicinity of a spray port. The lubricant sprayed from the spray port is electrostatically charged and sticks fast to the inner circumferential surface of the die bore, a tip face of the tip of the lower punch, and a tip face of the tip of the upper punch. The lubricant thus stuck does not fall off by a cause such as vibrations generated by vertical movements of the punches or a wind pressure generated by a high-speed rotation of the table, but is transferred and sticks to molded articles from the die bore and the tips when the raw powdery material is compressed and molded by the punches.

A sum of areas of the inner circumferential surface of the die bore and the tip face of the tip of the lower punch is larger than an area of the tip face of the tip of the upper punch. Accordingly, an amount of the lubricant applied to the inner circumferential surface of the die bore and the tip face of the tip of the lower punch is larger as compared with an amount of the lubricant applied to the tip face of the tip of the upper punch. In view of this, conventional control is performed to absorb predetermined amounts of the lubricant individually onto the inner circumferential surface of the die bore and the tip face of the tip of the lower punch, and onto the tip face of the tip of the upper punch by differentiating an intensity of charging in the downward spray portion and an intensity of charging in the upward spray portion from each other, while equal amounts of the powder lubricant are individually supplied to the downward spray portion and the upward spray portion from an external lubricant supply device.

However, according to such control, two electrostatic charging devices with application voltages different from each other should be installed, which increases a cost. In addition, the fact that an excess amount of the lubricant that may not be adhered onto the tip of the upper punch is sprayed from the upward spray portion is undeniable.

SUMMARY OF THE INVENTION

It is an object of the present invention to make it possible to spray and coat a necessary and sufficient amount of a lubricant onto each of an inner circumferential surface of a die bore and a tip face of a tip of a lower punch, and a tip face of a tip of an upper punch.

According to the present invention, a powder compression molding machine is configured to include a table having a die bore vertically penetrating therethrough; a pair of a lower punch and an upper punch individually having tips thereof that slide in the die bore and compress a powdery material filled in the die bore; a downward spray portion that sprays a lubricant toward an inner circumferential surface of the die bore and a tip face of the tip of the lower punch; an upward spray portion that sprays the lubricant toward a tip face of the tip of the upper punch; a first lubricant flow passage through which the lubricant supplied from a lubricant supply device externally provided is fed to the downward spray portion; and a second lubricant flow passage through which the lubricant supplied from the lubricant supply device externally provided is fed to the upward spray portion, the second lubricant flow passage being provided, at least partially, with a small-diameter region in which an inner diameter thereof is made smaller than that of the first lubricant flow passage. The powdery material in the invention refers to a collective form of minute solids, and includes so-called granules and powder with a shape smaller than that of the granules.

To state it differently, according to the invention, an adhering amount (to the inner circumferential surface of the die bore and the tip) of the lubricant is not controlled by changing the intensity of charging the lubricant between the upward spray portion and the downward spray portion as conventionally performed, but an amount of the lubricant itself to be supplied to the upward spray portion is arranged to be smaller than that to be supplied to the downward spray portion. With this arrangement, it is possible to supply necessary and sufficient amounts of the lubricant individually to the downward spray portion and the upward spray portion for spraying.

The powder compression molding machine includes, as its elements, a molding machine body provided therein with the table, the lower punch, the upper punch, the downward spray portion, and the upward spray portion; and a connection member that connects the molding machine body and the lubricant supply device provided externally to each other and causes the lubricant to flow therebetween. The connection member includes a branching having a first flow passage for circulating the lubricant toward the downward spray portion and a second flow passage for circulating the lubricant toward the upward spray portion. The second flow passage is provided with the small-diameter region. Accordingly, no particular modifications are necessary to the molding machine body and the lubricant supply device.

More specifically, the connection member is provided with a flow dividing block having one inflow passage and two outflow passages, and three tubes that are respectively attached to the inflow passage and the outflow passages of the flow dividing block. It is preferable that the tube attached to one of the outflow passages be provided with the small-diameter region in which the inner diameter thereof is made smaller than that of the tube attached to the other of the outflow passages.

The flow dividing block includes, as its elements, a block body and a flow dividing pipe portion that is detachably attached to the block body. A pipe line that communicates with the downward spray portion and a pipe line that communicates with the upward spray portion are formed in the flow dividing pipe portion. At the same time, the pipe line that communicates with the upward spray portion is provided with the small-diameter region in which the inner diameter thereof is made smaller than that of the pipe line that communicates with the downward spray portion. With this arrangement, the inner diameter of the small-diameter region can be changed by replacing the flow dividing pipe portion. As a result, it becomes easier to adjust a ratio of the amount of the lubricant to be fed to the upward spray portion to the amount of the lubricant to be fed to the downward spray portion by means of replacing the flow dividing pipe portion.

If a grounding member is attached to the connection member or the tube, and the connection member or the tube is grounded, a flow of the lubricant through the connection member becomes smooth.

According to the present invention, it is possible to spray and coat a necessary and sufficient amount of a lubricant onto each of an inner circumferential surface of a die bore and a tip face of a tip of a lower punch, and a tip face of a tip of an upper punch.

DETAILED DESCRIPTION OF THE PREFERRED EMBODIMENTS

Figure 1:
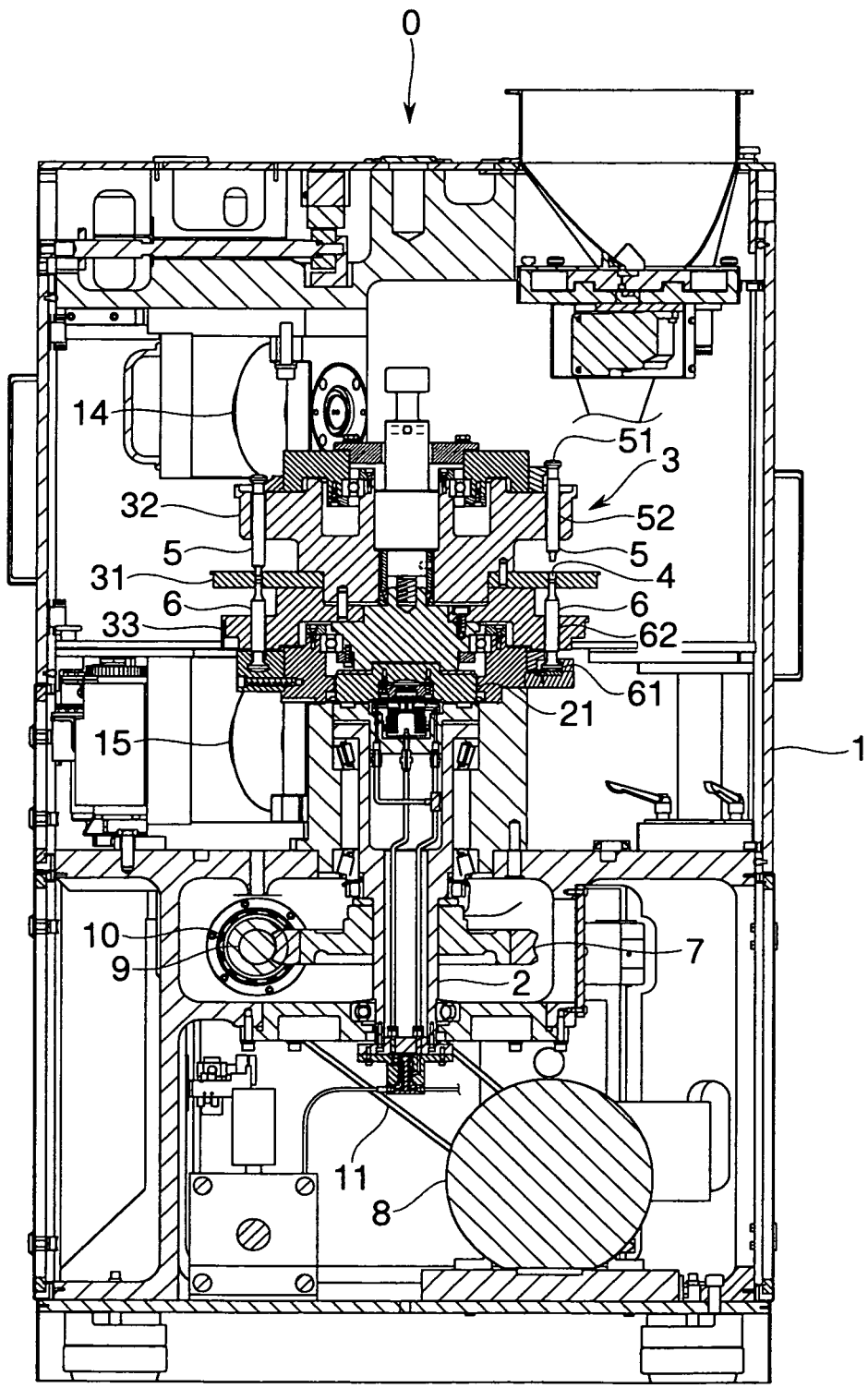
FIG. 1 is a sectional side view of a molding machine body according to an embodiment of the present invention.

An embodiment of the present invention will be described with reference to the drawings. A powder compression molding machine according to the embodiment is a so-called rotary type tabletting machine. As illustrated in FIG. 1, an upright shaft 2 serving as a rotary shaft is disposed in a frame of a molding machine body 0, and an turret 3 is attached to an upper portion of the upright shaft 2 via a connection portion 21.

Figure 2:
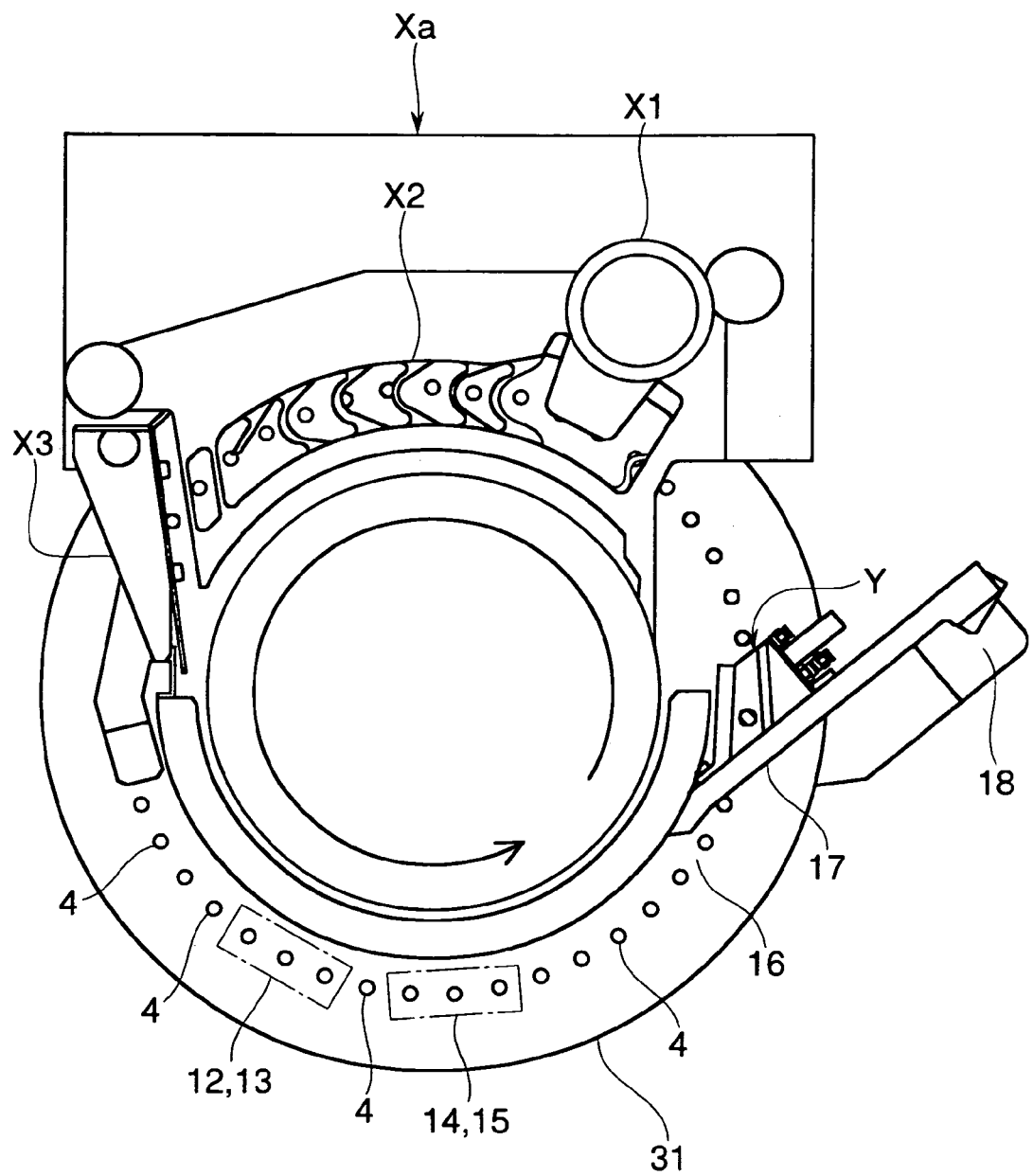
FIG. 2 is a plan view of a principal portion of the molding machine body.

The turret 3 rotates horizontally around an axis of the upright shaft 2, i.e., rotates on its axis. The turret 3 includes a table (a die disk) 31, an upper punch retaining portion 32, and a lower punch retaining portion 33. As illustrated in FIG. 2, the table 31 has substantially a disk shape, and is provided with a plurality of die bores 4 arranged in an outer circumference portion thereof at predetermined intervals along a rotation direction thereof. The die bores 4 vertically penetrate through the table 31. The table 31 may be such a form that can be divided into a plurality of plates. Alternatively, instead of forming the die bores 4 directly in the table 31 itself, the table 31 may be arranged in such a structure in which a plurality of die members that are separate forms from the table 31 are fitted to the table 31, and die bores are bored vertically through the die members, respectively.

Above and below each of the die bores 4, an upper punch 5 and a lower punch 6 are held so as to slide vertically relative to each of the die bores 4 by the upper punch retaining portion 32 and the lower punch retaining portion 33, respectively. A tip 53 of the upper punch 5 moves in and out of the die bore 4. A tip 63 of the lower punch 6 is always inserted into the die bore 4. The upper punch 5 and the lower punch 6 horizontally revolve around the axis of the upright shaft 2 together with the turret 3, that is, they orbit around the upright shaft 2.

A worm wheel 7 is fitted to a lower end of the upright shaft 2. A worm gear 10 engages with the worm wheel 7. The worm gear 10 is fixed to a gear shaft 9 driven by a motor 8. A driving force outputted by the motor 8 is transmitted to the gear shaft 9 by way of a belt 11 and rotatably drives the upright shaft 2, and, consequently, the turret 3 and the punches 5 and 6 through the worm gear 10 and the worm wheel 7.

As illustrated in FIG. 2, a pre compression upper roll 12 and a pre compression lower roll 13, and a main compression upper roll 14 and a main compression lower roll 15 vertically making individual pairs with each other in a manner to sandwich the punches 5 and 6 in between are provided on an orbit around the axis of the upright shaft 2 of the punches 5 and 6. The pre compression upper roll 12 and the pre compression lower roll 13, and the main compression upper roll 14 and the main compression lower roll 15 bias the upper punches 5 and the lower punches 6 toward each other so that the tips 53 and 63 compress, in a vertical direction, a raw powdery material filled in the die bore 4.

The upper punch 5 and the lower punch 6 individually have heads 51 and 61 that are depressed by the rolls 12, 13, 14, and 15, and individually have shafts 52 and 62 having diameters smaller than those of the heads 51 and 61, respectively. Front end portions of the shafts 52 and 62 are formed further smaller than other portions and have diameters substantially equal to an inner diameter of the die bore 4 so that the front end portions can be inserted into the die bores 4. Along with an orbiting motion of punches 5 and 6, the rolls 12, 13, 14, and 15 move closer to the heads 51 and 61 of the punches 5 and 6, and make contact with the heads 51 and 61 in a manner to run thereon. Further, the rolls 12, 13, 14, and 15, while rolling on the heads 51 and 61, are displaced horizontally and at the same time push down the upper punch 5 or push up the lower punch 6. During a period in which the rolls 12, 13, 14, and 15 are making contact with head flats of the punches 5 and 6, the punches 5 and 6 keep applying a certain amount of pressure to the raw powdery material in the die bores 4.

A product ejecting portion 16 is formed in a position advanced along a rotation direction of the turret 3 and the punches 5 and 6 from the position of pressurization by the main compression upper roll 14 and the main compression lower roll 15. In the product ejecting portion 16, the lower punch 6 moves up until a tip face of the tip 63 of the lower punch 6 is substantially aligned with an upper end of the die bore 4, i.e., an upper surface of the table 31, and pushes out a molded article in the die bore 4 from the die bore 4. A guide member 17 for guiding the molded article thus ejected is installed in the product ejecting portion 16. The molded article ejected from the die bore 4 makes contact with the guiding member 17 by a rotation of the turret 3 and moves along the guiding member 17 to a molded article collecting position 18.

Then, as illustrated in FIG. 2, a spray device Y, a filling device X, the pre compression rolls 12 and 13, the main compression rolls 14 and 15, and the product ejecting portion 16 are arranged in this sequence along a rotation direction of the turret 3.

The filling device X fills the raw powdery material into the die bore 4. If the product is a tablet, the raw powdery material is a powdery material including an active ingredient, or a powdery material including an active compound and an excipient. The filling device X has, as its elements, a powdery material supply mechanism X1, a feed shoe X2, and a level-off plate X3. The powdery material supply mechanism X1 guides the powdery material onto the revolution orbit of the die bore 4. The feed shoe X2 drops and fills the powdery material supplied by the powdery material supply mechanism X1 into the die bore 4 as the lower punch 6 moves down to a predetermined height. The level-off plate X3 levels off the powdery material that overflows the die bore 4 as the lower punch 6 moves up after the powdery material is filled by the feed shoe X2.

Figure 3:
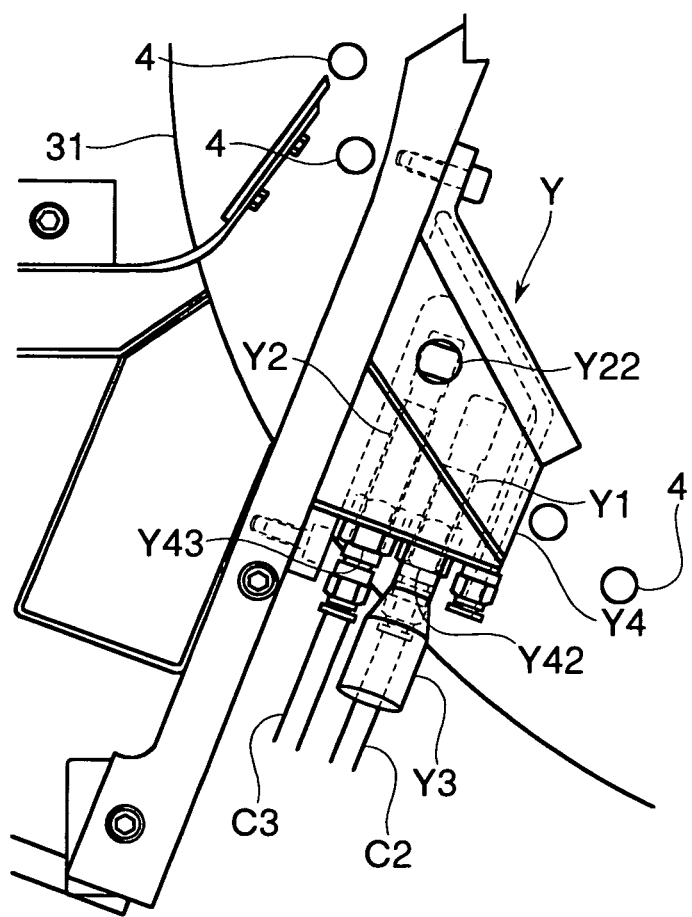
FIG. 3 is an enlarged plan view of a spray device provided in the molding machine body.

The spray device Y sprays powder lubricant onto an inner circumferential surface of the die bore 4, the tip face of the tip 63 of the lower punch 6, and the tip face of the tip 53 of the upper punch 5. The lubricant prevents the raw powdery material from adhering to the inner circumferential surface of the die bore, the tip faces of the tips 53 and 63 of the punches 5 and 6. As an example of the lubricant, metal stearate (particularly, magnesium stearate), talc and the like is named. As illustrated in FIG. 3, the spray device Y includes, as its elements, a spray nozzle Y1 for spraying the lubricant supplied from a lubricant supply device S toward the inner circumferential surface of the die bore 4 and the tip face of the tip 63 of the lower punch 6; a spray nozzle Y2 for spraying the lubricant supplied from the lubricant supply device S toward the tip face of the tip 53 of the upper punch 5; a suction duct Y3 that sucks a surplus of lubricant or the like that does not adhere to the die bore 4, or the tips 53 and 63 of the punches 5 and 6, and discharges the lubricant so externally that the lubricant is fed back to the lubricant supply device S; and a case Y4 for holding the spray nozzle Y1, the spray nozzle Y2, and the suction duct Y3.

Figure 4:
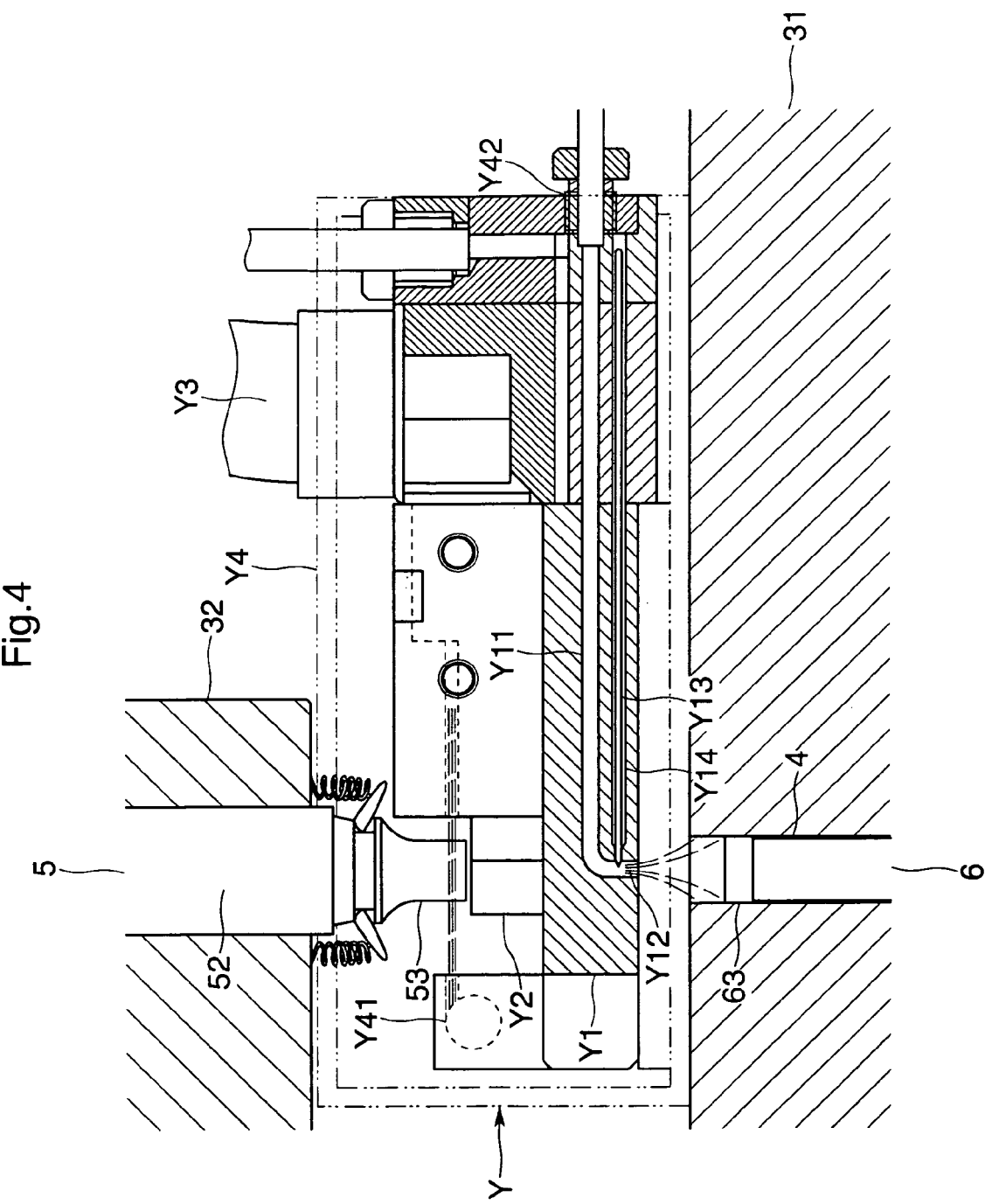
FIG. 4 is a sectional side view of a principal portion of the spray device provided in the molding machine body.

The spray nozzle Y1 includes a downward spray portion Y12 for spraying the lubricant downward. To be specific, as illustrated in FIG. 4, the spray nozzle Y1 has a circulation pipe Y11 formed by boring a hole in a block made of fluororesin (particularly, polytetrafluoroethylene) extending in a substantially horizontal direction therein, and by bending a front end of the circulation pipe Y11 downward to form a spray port Y12 opening in a lower face of the block. The opening portion of the spray port Y12 is the downward spray portion. In this way, the circulation of the lubricant is performed smoothly by bending the front end of the circulation pipe Y11 downward.

In addition, inner surfaces of the circulation pipe Y11 and the spray port Y12 are flat surfaces of the fluororesin, which makes the circulation and spraying of the lubricant smooth. A static electricity generation electrode Y13 is buried in the spray nozzle Y1. A front end of the static electricity generation electrode Y13 is in a needle or tapered shape, and protrudes in an area close to the spray port Y12. The static electricity generation electrode Y13 receives a high DC voltage of about −20 kV from a charging device (not illustrated), and forcibly electrifies, with electrostatic charges, the lubricant immediately before being sprayed from the spray port Y12 by an electric field concentrated on the front end thereof.

The spray nozzle Y2 includes an upward spray portion Y22 for spraying the lubricant upward. The spray nozzle Y2 has such a structure in which the spray nozzle Y1 illustrated in FIG. 4 is placed upside down. Specifically, the spray nozzle Y2 has a circulation pipe (not illustrated) formed by boring a hole in a block made of fluororesin horizontally extending therein, and by bending a front end of the circulation pipe upward to form a spray port Y22 opening in an upper face of the block. The opening portion of the spray port Y22 is the upward spray portion. In this way, the circulation of the lubricant is performed smoothly by bending the front end of the circulation pipe upward. In addition, inner surfaces of the circulation pipe and the spray port Y22 are flat surfaces of the fluororesin, which makes the circulation and spraying of the lubricant smooth. A static electricity generation electrode (not illustrated) is also buried in the spray nozzle Y2. A front end of the static electricity generation electrode is in a needle or tapered shape, protrudes in an area close to the spray port Y22, and forcibly electrifies, with electrostatic charges, the lubricant immediately before being sprayed from the spray port Y22.

Figure 12:
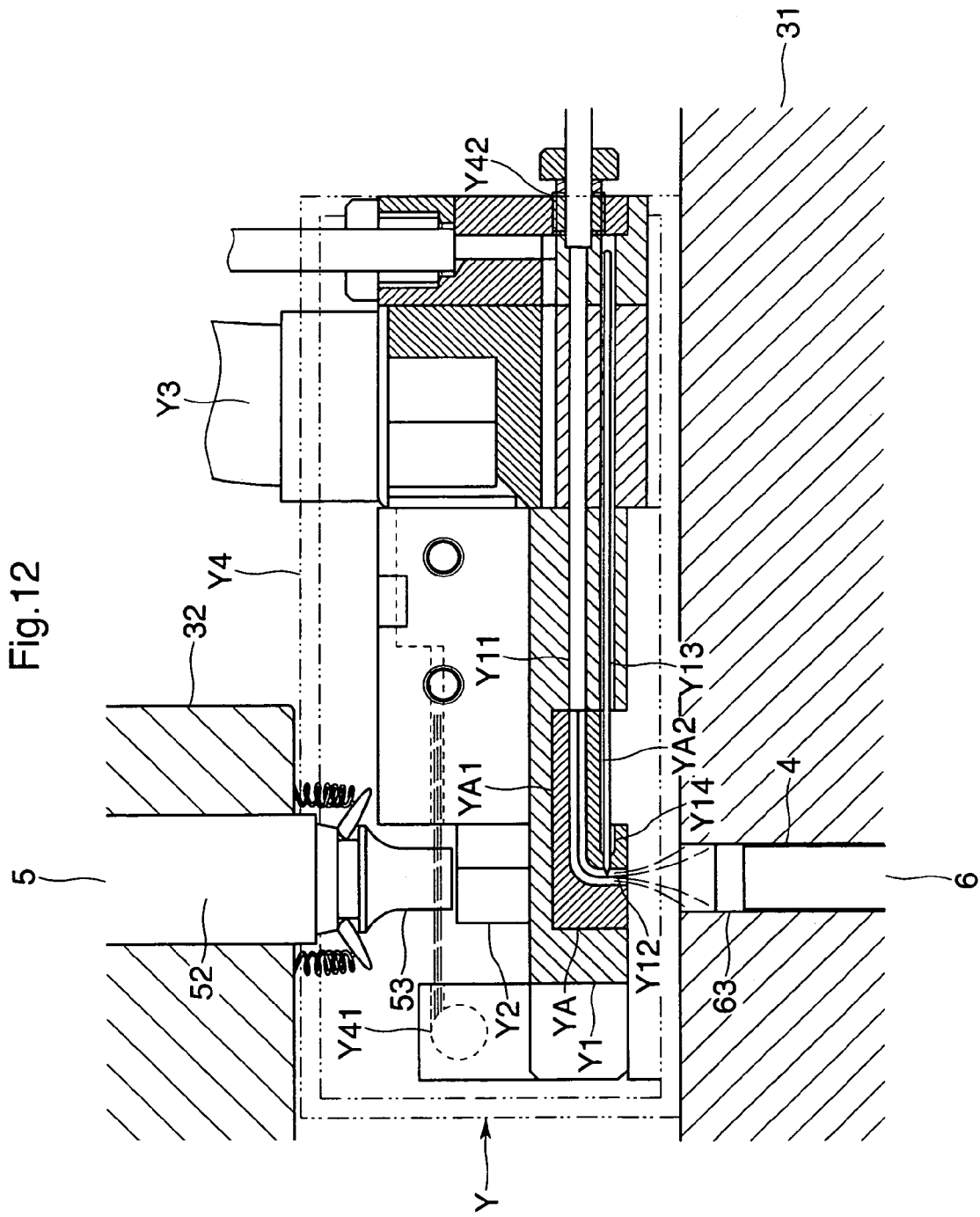
FIG. 12 is a sectional side view of a principal portion of a spray nozzle according to one variation of the present invention.
Figure 13:
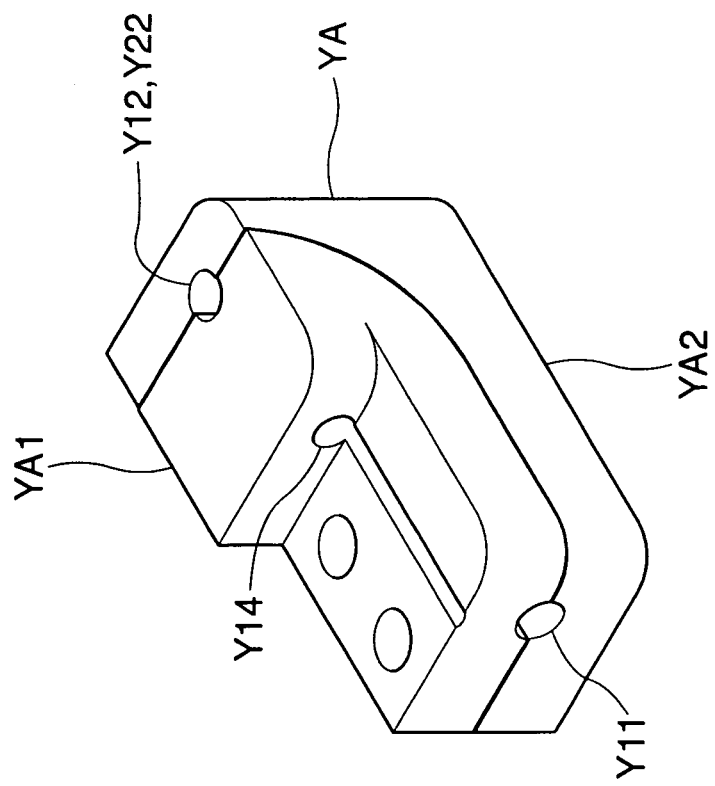
FIG. 13 is a perspective view of members in the vicinity of a spray portion of the spray nozzle according to the variation of the present invention.
Figure 14:
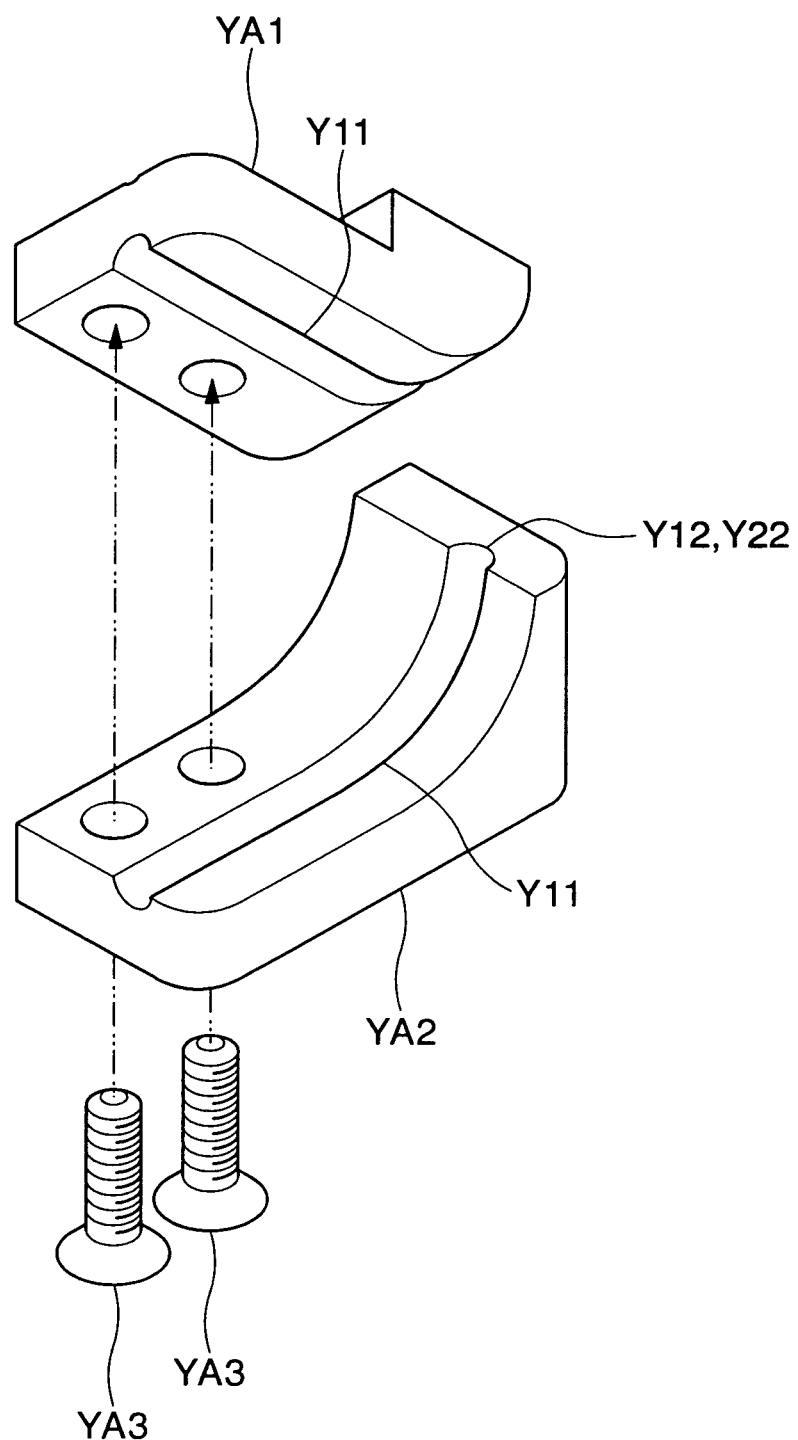
FIG. 14 is an exploded perspective view of the members in the vicinity of the spray nozzle illustrated in FIG. 13.
Figure 15:
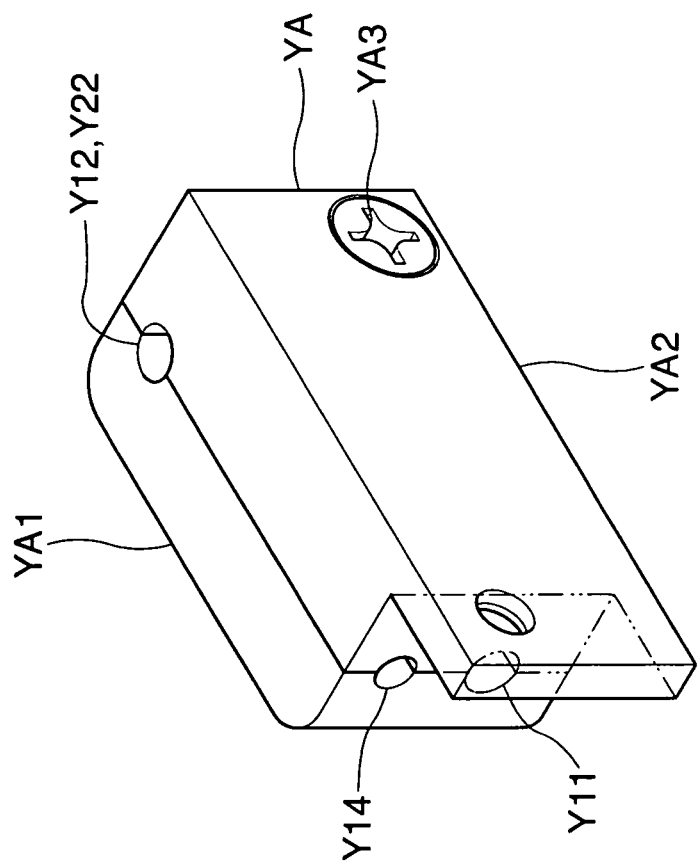
FIG. 15 is a perspective view of the members in the vicinity of the spray nozzle according to the variation.
Figure 16:
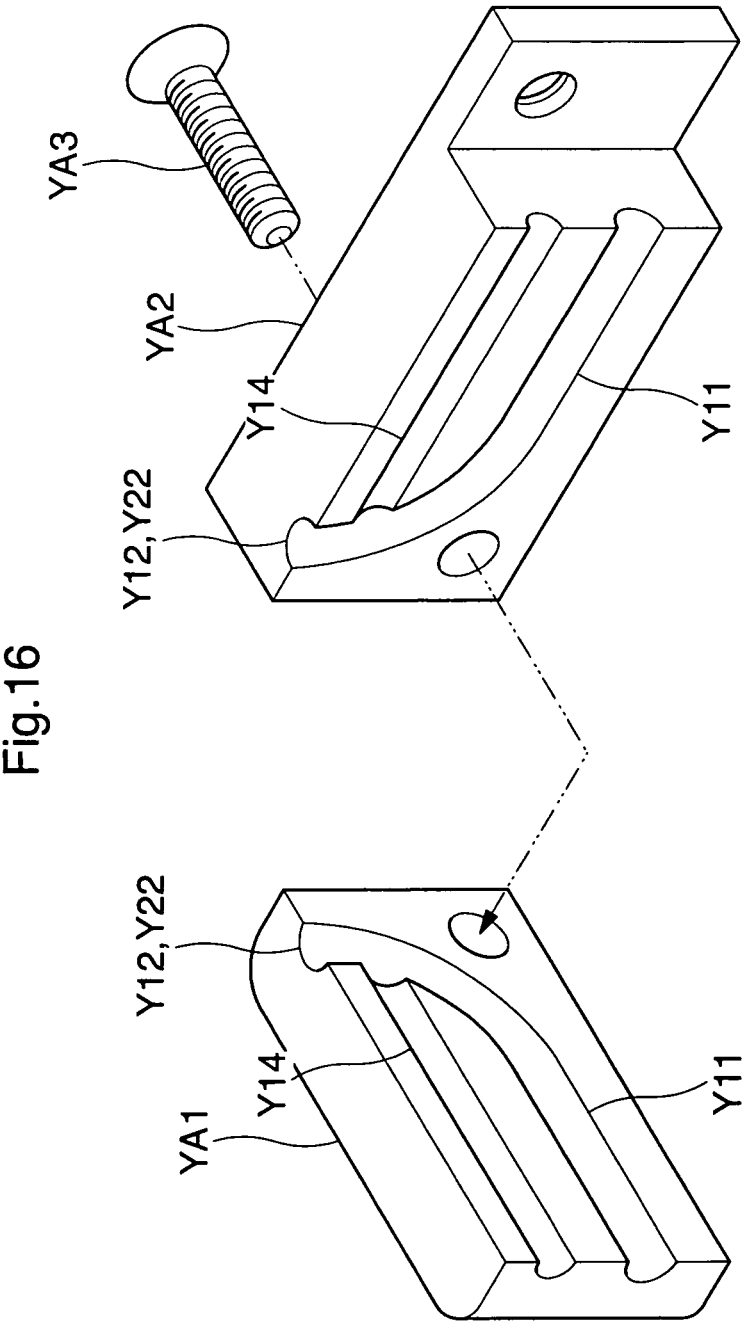
FIG. 16 is an exploded perspective view of the members in the vicinity of the spray nozzle illustrated in FIG. 15.

Incidentally, it can also be conceivable to arrange portions around the spray portions Y12 and Y22 of the spray nozzles Y1 and Y2 as removably attached to main bodies of the spray nozzles Y1 and Y2, and make an arrange so that such portions can be disassembled into a plurality of components. For example, as illustrated in FIGS. 12 to 14, a member YA that encloses front ends of the spray portions Y12 and Y22, and the circulation pipe Y11 is structured to be disassembled into components YA1 and YA2 that divides the circulation pipe Y11 into an upper half and a lower half. Alternatively, as illustrated in FIGS. 15 and 16, the member YA that encloses the front ends of the spray portions Y12 and Y22, and the circulation pipe Y11 is structured to be disassembled into components YA1 and YA2 that divides the circulation pipe Y11 into a right half and a left half. The two components YA1 and YA2 are integrated together using a fixing tool YA3 such as a countersunk screw or the like. In the illustrations, reference symbol Y14 indicates a hole into which the static electricity generation electrode Y13 is inserted.

Conventionally, holes were made in main bodies of the spray nozzles Y1 and Y2 to form the circulation pipes Y11. However, it was difficult to make the surface roughness smaller on an inner circumferential surface of a curved portion at the front end of the circulation pipe Y11. This sometimes caused a problem in circulating the lubricant. In contrast, if the member YA that encloses the front ends of the spray portions Y12 and Y22, and the circulation pipe Y11 is structured to be divided into the components YA1 and YA2, it becomes easy to make the surface roughness smaller on the inner circumferential surface of the curved portion at the front end of the circulation pipe Y11, and the circulation of the lubricant is performed smoothly. In addition, with this arrangement, it is easy to form the curved portion at the front end of the circulation pipe Y11, and a direction to spray the lubricant can be arbitrarily decided. Other than this, even if the lubricant sticks firmly inside the spray portions Y12 and Y22, or inside the circulation pipe Y11, cleaning work also becomes easier.

The suction duct Y3 is located in a position having a height facing a side of the tip 53 of the upper punch 5. An opening portion of the suction duct Y3 is fixed to the case Y4 and communicates with an internal space of the case Y4.

The case Y4 is a box body made of fluororesin that nearly covers the spray nozzle Y1 and the spray nozzle Y2 to prevent deregulated dispersion of the lubricant. The case Y4 is provided with an air curtain Y41 formed by blowing out compressed air substantially in a horizontal direction toward the opening of the suction duct Y3. The air curtain Y41 forms an air flow in the vicinity of the tip 53 of the upper punch 5, and prevents the lubricant that is sprayed from the spray nozzle Y2 toward the tip 53 of the upper punch 5 from being scattered upwardly. A connection portion Y42 that communicates with the circulation pipe Y11 of the spray nozzle Y1 and a connection portion Y43 that communicates with the circulation pipe of the spray nozzle Y2 are juxtaposed to each other in a portion facing proximal sides of the spray nozzles Y1 and Y2 in the case Y4. Tubes C2 and C3 of a connection member C which will be described later are connected to these connection portions Y42 and Y43, respectively.

In the production process of the product, first, the spray nozzle Y2 of the spray device Y sprays and coats the lubricant onto the tip face of the tip 53 of the upper punch 5 that passes nearby. Before or after this, the spray nozzle Y1 sprays and coats the lubricant onto the inner circumferential surface of the die bore 4 and the tip face of the tip 63 of the lower punch 6 that pass nearby. The lubricant is forcibly electrified with static charges when it is sprayed through the spray ports Y12 and Y22 of the spray nozzles Y1 and Y2. The die bore 4, and the punches 5 and 6 are grounded through the turret 3, and therefore the lubricant that is forcibly charged with electrostatic charges is strongly attracted and sticks onto the inner circumferential surface of the die bore 4, the tip face of the tip 63 of the lower punch 6, and the tip face of the tip 53 of the upper punch 5 which are all metallic surfaces. The lubricant that does not stick to the die bore 4, or the punches 5 and 6 is sucked into the suction duct Y3 and fed back to the lubricant supply device S by way of a return flow passage (not illustrated).

Subsequently, the filling device X fills the raw powdery material into the die bore 4 that passes nearby. Thereafter, the upper punch 5 and the lower punch 6 perform pre compression on the powdery material in the die bore 4 by being depressed by the pre compression rolls 12 and 13, respectively, and further perform main compression on the powdery material in the die bore 4 by being depressed by the main compression rolls 14 and 15. With this arrangement, a product resulted from compressing and molding the raw powdery material is completed.

The lubricant supply device S is disposed outside the molding machine body 0. The lubricant supply device S is a known device provided with a μR feeder unit (product name of Nisshin Engineering Inc.) that takes out the powder lubricant that is stored, little by little, accurately, and steadily, by means of a filling roll of a thin-groove filling type, and pneumatically feeds the lubricant thus taken out by carrying the lubricant by pressurized air.

Figure 5:
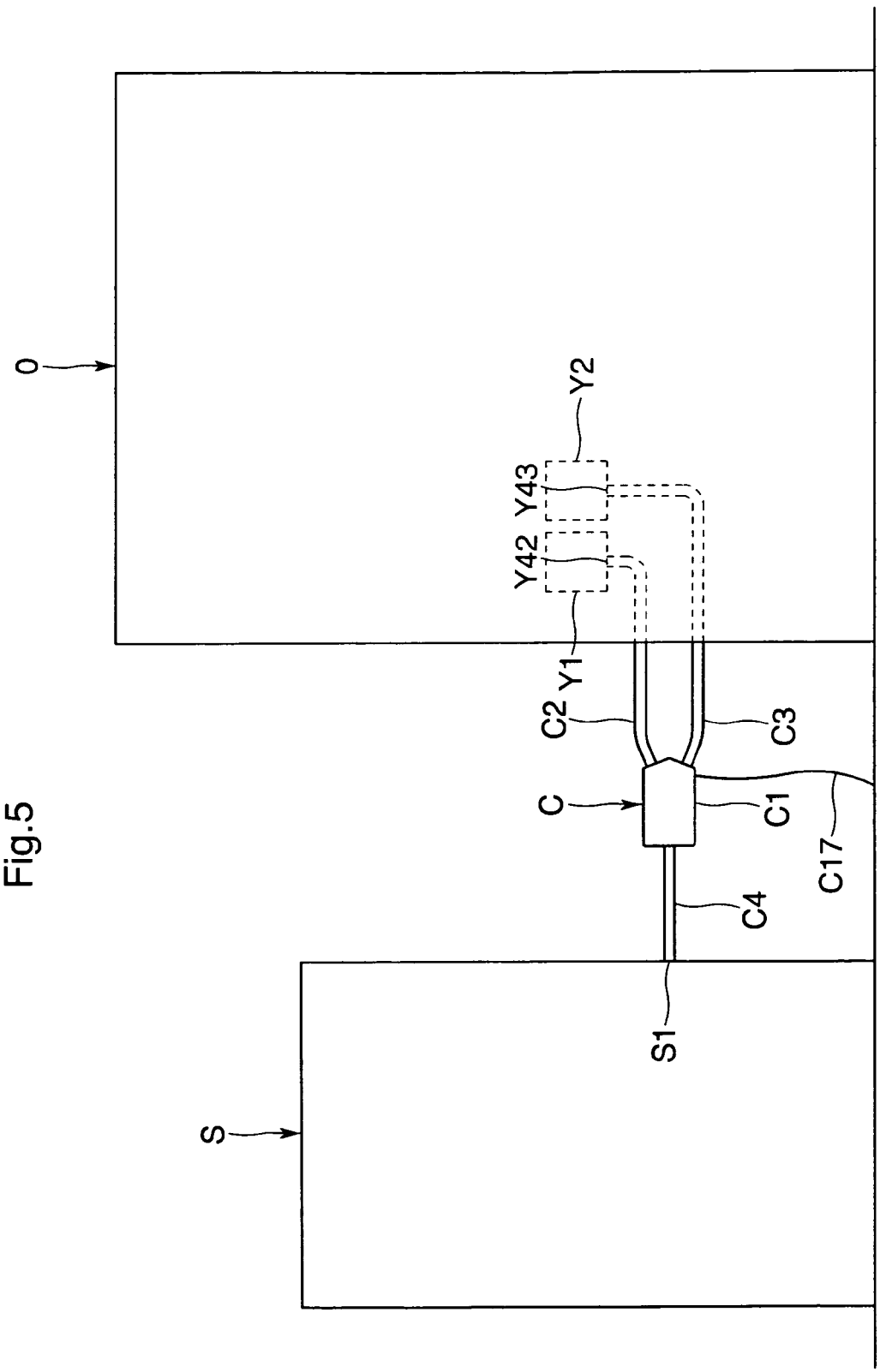
FIG. 5 is a diagram illustrating an overall structure of a powder compression molding machine according to the embodiment.
Figure 6:
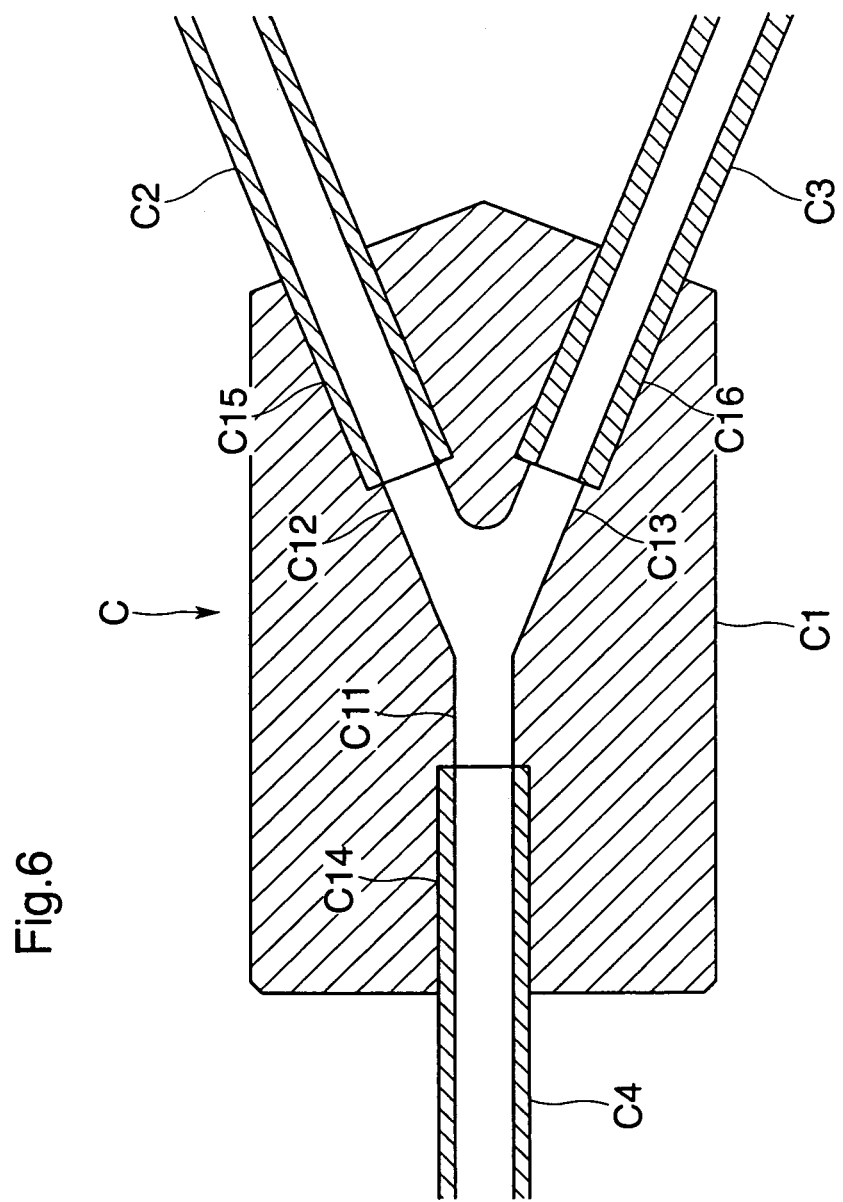
FIG. 6 is a horizontal sectional view of a connection member according to the embodiment.

As illustrated in FIG. 5, the molding machine body 0 and the lubricant supply device S are connected with each other by the connection member C. The connection member C plays a role of causing the lubricant pneumatically fed by the lubricant supply device S to flow toward the spray nozzles Y1 and Y2 of the molding machine body 0. As illustrated in FIG. 6, the connection member C according to the present embodiment is provided with a flow dividing block C1 including a single inflow passage C11 and two outflow passages C12 and C13, and three tubes C2, C3, and C4 individually attached to the inflow passage C11, and each of the outflow passages C12 and C13 of the flow dividing block C1.

The flow dividing block C1 in its entirety is formed of fluororesin (particularly, polytetrafluoroethylene). The flow dividing block C1 includes therein the inflow passage C11, the first outflow passage C12, and the second outflow passage C13, and these just form a two-way Y-shaped branch in which the outflow passages C12 and C13 branch out from the inflow passage C11 in plan view. Provided at an outer end portion of the inflow passage C11 is an insertion portion C14 which has a diameter larger than other portions of the inflow passage C11 and into which the third tube C4 is to be inserted. In a similar manner, provided at outer end portions of the first outflow passage C12 and the second outflow passage C13 are an insertion portion C15 which has a larger diameter and into which the first tube C2 is to be inserted and an insertion portion C16 which has a larger diameter and into which the second tube C3 is to be inserted, respectively.

The first tube C2 is for circulating the lubricant toward the spray nozzle Y1. One end of the first tube C2 is connected to the insertion portion C15 communicating with the first inflow passage C12 of the flow dividing block C1, and the other end thereof is connected to the connection portions Y42 communicating with the circulation pipe Y11 of the spray nozzle Y1. An inner diameter of the first tube C2 is substantially equal to an inner diameter of the first outflow passage C12.

The second tube C3 is to distribute the lubricant toward the spray nozzle Y2. One end of the second tube C3 is connected to the insertion portion C16 communicating with the second outflow passage C13 of the flow dividing block C1, and the other end thereof is connected to the connection portion Y43 communicating with the circulation pipe of the spray nozzle Y2. The inner diameter of the second tube C3 is made smaller than the inner diameter of the first tube C2.

Figure 7:
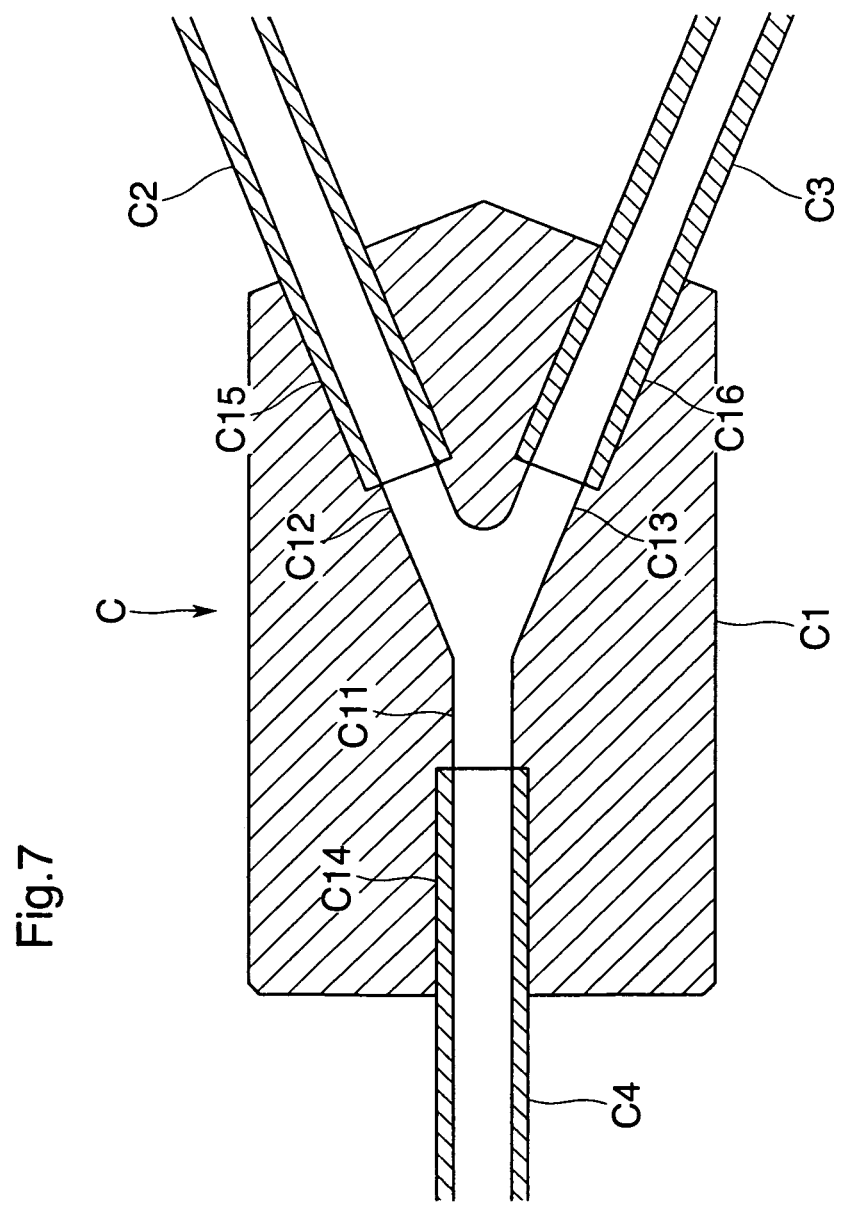
FIG. 7 is a horizontal sectional view of a connection member according to the embodiment.

In the case where the inner diameters of the second tube C3 and the second outflow passage C13 are different from each other, as illustrated in FIG. 7, the inner circumference of the one end of the second tube C3 may be formed to become gradually larger toward the open end thereof. With this arrangement, while the one end of the second tube C3 is inserted into the insertion portion C16, the inner circumference of the second outflow passage C13 and the inner circumference of the second tube C3 have a continuous form without having a step.

The third tube C4 is to lead the lubricant into the flow dividing block C1. The one end of the third tube C4 is connected to the insertion portion C14 communicating with the inflow passage C11 of the flow dividing block C1, and the other end thereof is connected to a lubricant supply port S1 of the lubricant supply device S. The inner diameter of the third tube C4 is substantially equal to the inner diameter of the inflow passage C11.

It is preferable that the connection member C, the third tube C4, or the first and second tubes C2 and C3 be grounded. In the present embodiment, a grounding member C17 is attached to the first and second tubes C2 and C3 for grounding.

The lubricant supplied by the lubricant supply device S flows into the inflow passage C11 of the flow dividing block C1 through the third tube C4, and is split into the two outflow passages C12 and C13. A part of the lubricant that flows into the first outflow passage C12 reaches the circulation pipe Y11 of the spray nozzle Y1 through the first tube C2, and is sprayed from the spray port Y12 toward the die bore 4 and the tip 63 of the lower punch 6. The remaining lubricant that flows into the second outflow passage C13 reaches the circulation pipe of the spray nozzle Y2 through the second tube C3, and is sprayed from the spray port Y22 toward the tip 53 of the upper punch 5. As already described, the inner diameter of the second tube C3 is smaller than that of the first tube C2. As a result, a flow rate of the lubricant that is distributed to the spray nozzle Y2 is smaller than a flow rate of the lubricant that is distributed to the spray nozzle Y1. Consequently, a spray amount of the lubricant sprayed from the spray nozzle Y2 is regulated smaller than a spray amount of the lubricant sprayed from the spray nozzle Y1.

Here, the amounts of the lubricant sprayed from the spray portions Y12 and Y22 become stable by providing reasonable lengths for the first tube C2 and the second tube C3.

Figure 8:
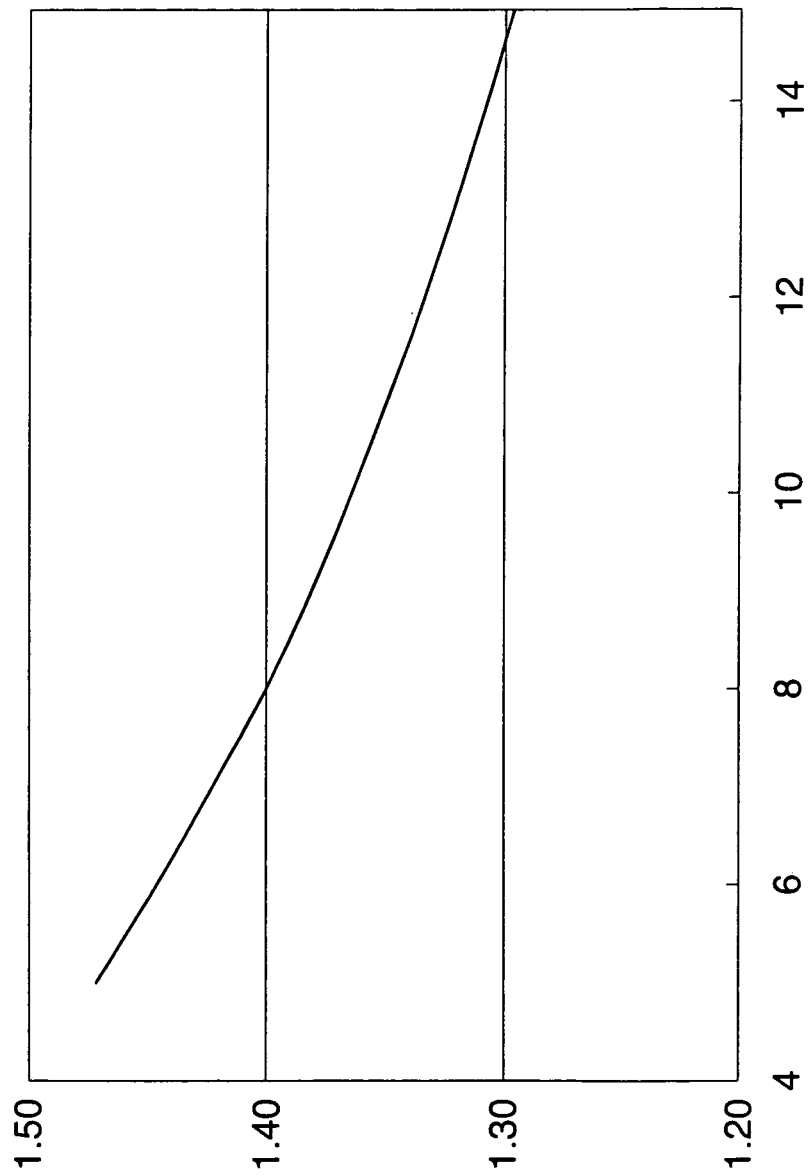
FIG. 8 is a graph representing a relation between a diameter and an area ratio of a molded article.

FIG. 8 illustrates a relationship between the inner diameter of the die bore 4, i.e., a diameter of the molded article (product), and an area ratio of an area to be coated with the lubricant. Referring to a graph of FIG. 8, a horizontal axis represents the diameter of the molded article, and a vertical axis represents the area ratio. The "area ratio" in this context is a ratio resulted from dividing a numerator which is a sum of areas of the inner circumferential surface of the die bore 4 and the tip face of the tip 63 of the lower punch 6 by a denominator which is an area of the tip face of the tip 53 of the upper punch 5. For example, if it is assumed that the diameter of the molded article is 8 mm, the area ratio is 1.4. Accordingly, a ratio of 1.4 is also an optimum ratio of the amount of the lubricant to be sprayed, by the downward spray portion Y12, onto the inner circumferential surface of the die bore 4 and the tip face of the tip 63 of the lower punch 6 to the amount of the lubricant to be sprayed, by the upward spray portion Y22, onto the tip face of the tip 53 of the upper punch 5.

Figure 9:
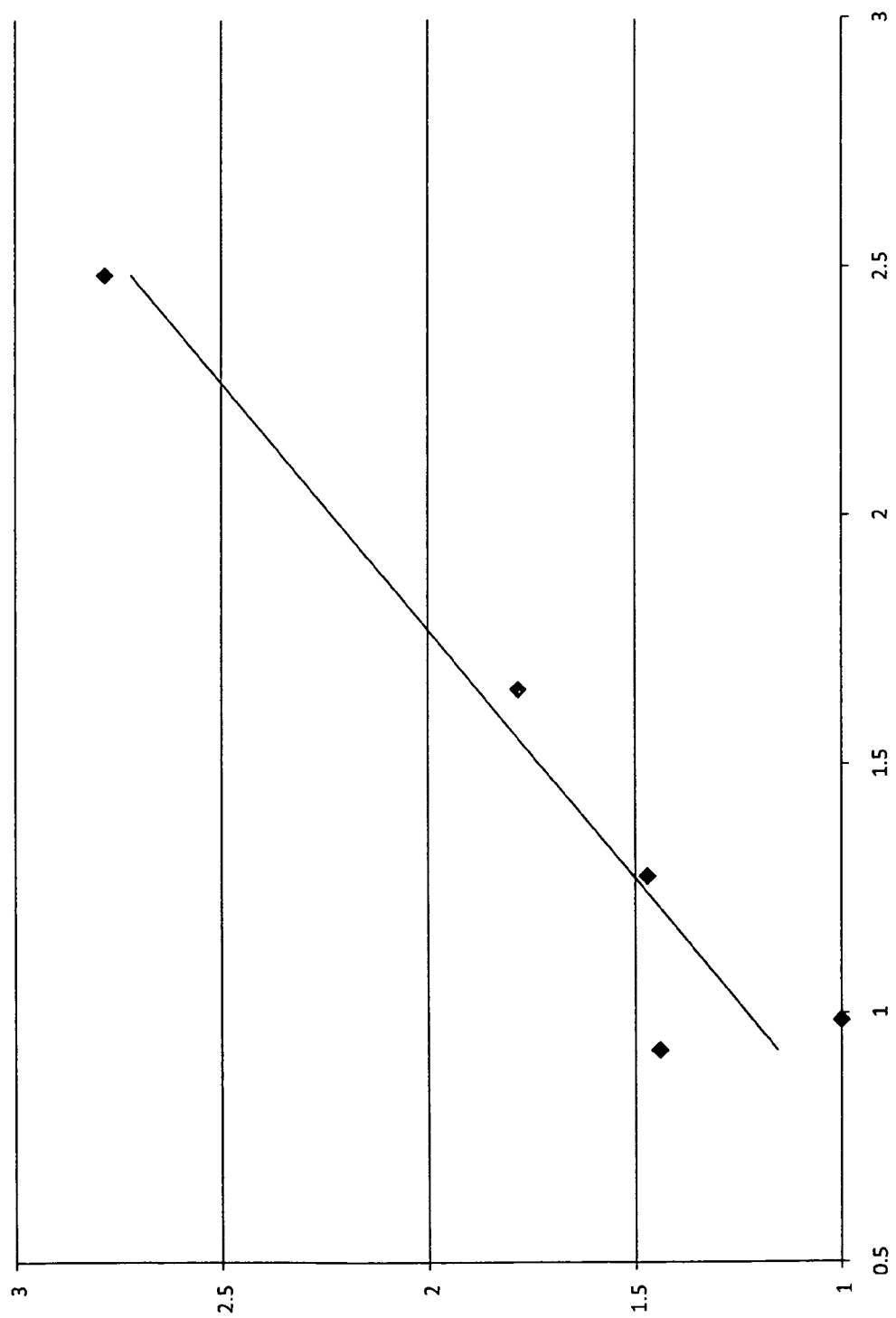
FIG. 9 is a graph representing a relation between a ratio of the cross sectional areas of flow passages and an actual measurement spray ratio of tubes according to the embodiment.

In addition, FIG. 9 illustrates a result of an actual measurement spray ratio by changing the internal diameters of the first tube C2 and the second tube C3, respectively, in various ways. The "actual measurement spray ratio" is a calculated ratio of a measured amount of the lubricant sprayed toward the inner circumferential surface of the die bore 4 and the tip face of the tip 63 of the lower punch 6 to a measured amount of the lubricant sprayed toward the tip face of the tip 53 of the upper punch 5. Referring to the graph of FIG. 9, the horizontal axis represents the actual measurement spray ratio, and the vertical axis represents a ratio of a cross sectional area of a flow passage in the first tube C2 to a cross sectional area of a flow passage in the second tube C3. As obvious from FIG. 9, it is possible to control the actual measurement spray ratio according to the ratio of the cross sectional areas of the passages of the two tubes C2 and C3.

Table 1 indicates an experimental result of spraying the lubricant. In this experiment, the diameter of the molded article is assumed to be 8 mm, and a target is to obtain the actual measurement spray ratio of 1.4. In the experiment, tubes having an external diameter of 4 mm and an internal diameter of 3 mm, and an external diameter of 4 mm and an internal diameter of 2 mm are prepared. These tubes are used as the first tube C2, the second tube C3, and the third tube C4. The flow dividing block C1, the first tube C2, and the third tube C4 are common in Examples 1 to 4 and Comparative Example. The individual inner diameters of the inflow passage C11 and the outflow passages C12 and C13 of the flow dividing block C1, and the individual inner diameters of the first tube C2 and the third tube C4 are all same at 3 mm. Contrarily, although the inner diameters of the second tube C3 is 3 mm which is same as that of the first tube C2 in Comparative Example, it is arranged smaller to 2 mm in Examples 1 to 4. In Examples 2 and 4, the first tube C2 and the second tube C3 are grounded. However, in Examples 1, 3 and Comparative Example, the first tube C2 and the second tube C3 are not grounded. In addition, in Examples 3 and 4, a tube having a special shape in which an inner diameter of an inner circumference of one end thereof varies gradually (illustrated in FIG. 7) is used as the second tube C3.

Measurements are conducted five times individually in Examples 1 to 4 and Comparative Example on the amounts of the lubricant sprayed toward the inner circumferential surface of the die bore 4 and the tip face of the tip 63 of the lower punch 6 and the amounts of the lubricant sprayed toward the tip face of the tip 53 of the upper punch 5 for a period of one hour.

The lubricant supply device S used in the experiment is "ELS-P1-3" of Nisshin Engineering Inc. The lubricant supply device S provided with a filling roll having a groove width of 2.5 mm and a groove depth of 2.5 mm is used. The experiment is conducted at a revolution speed of 6 rpm, while an amount of the lubricant to be sprayed is set at 120 to 130 g/h. The experiment is conducted under the environment with a room temperature of 20 to 25° C. and a humidity of 35 to 45%.

TABLE 1

|  | Comparative Example | Example 1 | Example 2 | Example 3 | Example 4 |
|---|---|---|---|---|---|
| Actual measurement spray ratio (first time) | 1.02 | 1.33 | 1.67 | 1.21 | 1.44 |
| Actual measurement spray ratio (second time) | 0.98 | 1.30 | 1.71 | 1.22 | 1.39 |
| Actual measurement spray ratio (third time) | 0.96 | 1.31 | 1.41 | 1.42 | 1.43 |
| Actual measurement spray ratio (fourth time) | 0.98 | 1.33 | 1.42 | 1.31 | 1.32 |
| Actual measurement spray ratio (fifth time) | 0.99 | 1.33 | 1.48 | 1.53 | 1.46 |
| Average | 0.99 | 1.32 | 1.54 | 1.34 | 1.41 |
| Maximum | 1.02 | 1.33 | 1.71 | 1.53 | 1.46 |
| Minimum | 0.96 | 1.30 | 1.41 | 1.21 | 1.32 |
| Range | 0.06 | 0.03 | 0.30 | 0.32 | 0.13 |
| Standard deviation | 0.02 | 0.01 | 0.14 | 0.14 | 0.05 |
| Coefficient of variation | 2.22 | 0.98 | 9.33 | 10.29 | 3.77 |

As indicated in Table 1, in Comparative Example in which the inner diameters of the first tube C2 and the second tube C3 are equal to each other, the actual measurement spray ratio is close to 1. In contrast, in Examples 1 to 4, the actual measurement spray ratio is sufficiently larger than 1. This means that there is a clear difference between the amount of the lubricant sprayed toward the inner circumferential surface of the die bore 4 and the tip face of the tip 63 of the lower punch 6 and the amount of the lubricant sprayed toward the tip face of the tip 53 of the upper punch 5.

When Examples 2 and 4 are compared with Example 1, the actual measurement spray ratio tends to become larger in the case where the first tube C2 and the second tube C3 are grounded than the case where the first tube C2 and the second tube C3 are not grounded. Further, when Example 4 is compared with Examples 2 and 3, it is found that variations in the actual measurement spray ratio are suppressed when the first tube C2 and the second tube C3 are grounded, and the tube having a special shape is used as the second tube C3.

According to the present embodiment, the powder compression molding machine is configured to include the table 31 having the die bore 4 vertically penetrating therethrough; a pair of a lower punch 6 and an upper punch 5 individually having tips 63 and 53 thereof that slide in the die bore 4 and compress a powdery material filled in the die bore 4; a downward spray portion Y12 that sprays a lubricant toward an inner circumferential surface of the die bore 4 and a tip face of the tip 63 of the lower punch 6; an upward spray portion Y22 that sprays the lubricant toward a tip face of the tip 53 of the upper punch 5; a first lubricant flow passage (the first outflow passage C12, the first tube C2 and the circulation pipe Y11 of the spray nozzle Y1) through which the lubricant supplied from a lubricant supply device S externally provided is fed to the downward spray portion Y12; and a second lubricant flow passage (the second outflow passage C13, the second tube C3 and the circulation pipe of the spray nozzle Y2) through which the lubricant supplied from the lubricant supply device S externally provided is fed to the upward spray portion Y22, the second lubricant flow passage being provided, at least partially, with a small-diameter region (the second tube C3) in which an inner diameter thereof is made smaller than that of the first lubricant flow passage. Accordingly, it is possible to reduce the amount of the lubricant to be fed to the upward spray portion Y22 smaller than that to be fed to the downward spray portion Y12, and spray a necessary and sufficiently amount of the lubricant from the upward spray portion Y22. Since the lubricant that can not stick to the tip 53 of the upper punch 5 is prevented from being sprayed from the upward spray portion Y22 needlessly, a purging amount of the lubricant can be reduced.

The powder compression molding machine includes, as its elements, a molding machine body 0 provided therein with the table 31, the lower punch 6, the upper punch 5, the downward spray portion Y12, and the upward spray portion Y22; and a connection member C that connects the molding machine body 0 and the lubricant supply device S provided externally to each other and causes the lubricant to flow therebetween. The connection member C includes a branching having a first flow passage (the first outflow passage C12 and the first tube C2) for circulating the lubricant toward the downward spray portion Y12 and a second flow passage (the second outflow passage C13 and the second tube C3) for circulating the lubricant toward the upward spray portion Y22, and the second flow passage is provided with the small-diameter region (the second tube C3). Accordingly, no particular modifications are necessary to the molding machine body 0 and the lubricant supply device S.

The connection member C is provided with a flow dividing block C1 including one inflow passage C11 and two outflow passages C12 and C13, and three tubes C4, C2, and C3 that are respectively attached to the inflow passage C11 and the outflow passages C12 and C13 of the flow dividing block C1. The second tube C3 that is attached to one C13 of the outflow passages is provided with the small-diameter region in which the inner diameter thereof is made smaller than that of the first tube C2 attached to the other C12 of the outflow passages. Accordingly, it is easy to secure a certain length or more of the small-diameter region. Therefore, since a certain length or more of the small-diameter region of the second tube C3 can be secured, it is possible to sufficiently differentiate the amount of the lubricant to be fed to the downward spray portion Y12 from the amount of the lubricant to be fed to the upward spray portion Y22.

The grounding member C17 is fitted to the connection member C, or the first tube C2 and the second tube C3. The connection member C, or the first tube C2 and the second tube C3 are grounded. Accordingly, the lubricant that circulates in the connection member C is not charged and therefore can smoothly flow.

It should be noted that the present invention is not limited to the foregoing embodiment. Although the flow dividing block C1 is an integrally molded article in the foregoing embodiment, it is also conceivable to use a plurality of components to form the flow dividing block C1, and make such an arrangement to use replacement components to change the internal diameters of the outflow passages C12 and C13. Hereinafter, a description will be given of a variation of the flow dividing block C1.

Figure 10:
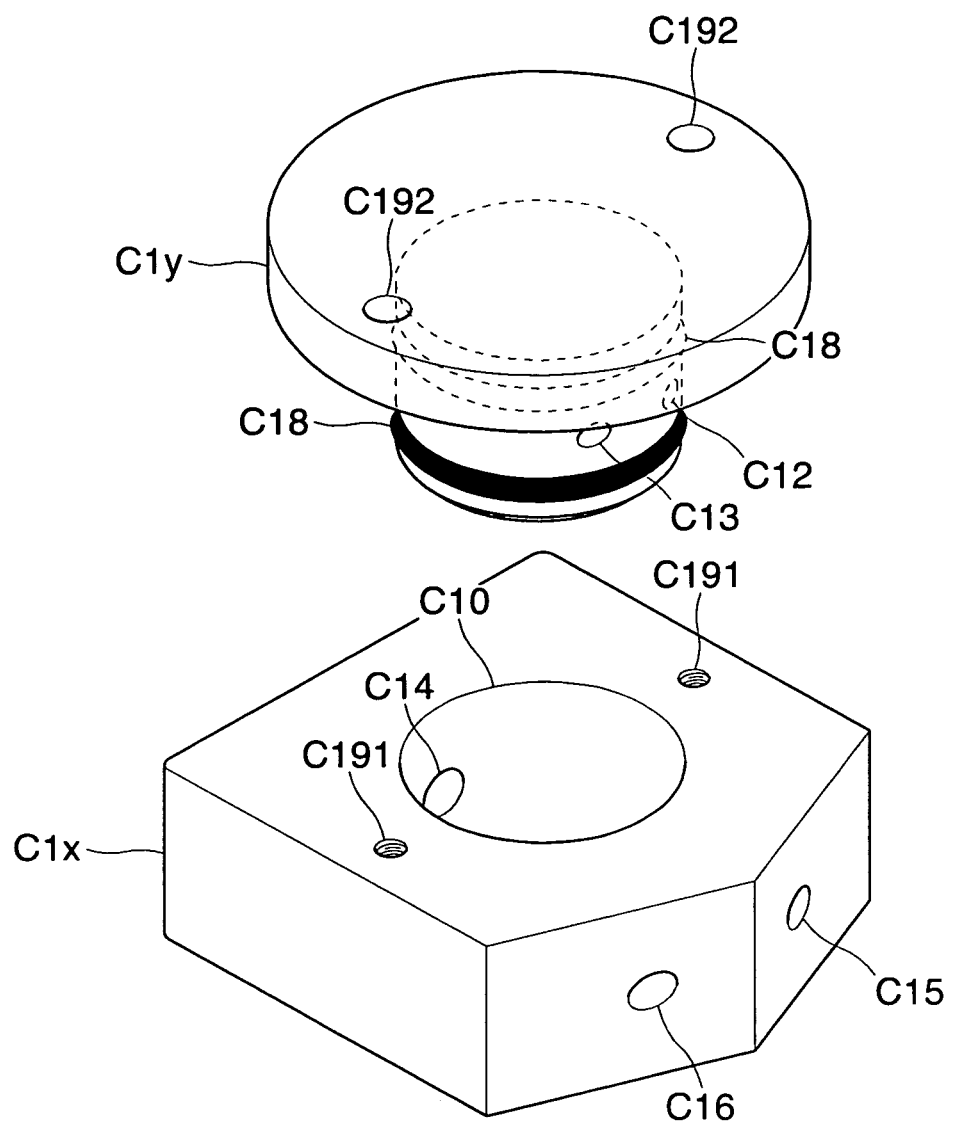
FIG. 10 is an exploded perspective view of a connection member according to a variation of the present invention.
Figure 11:
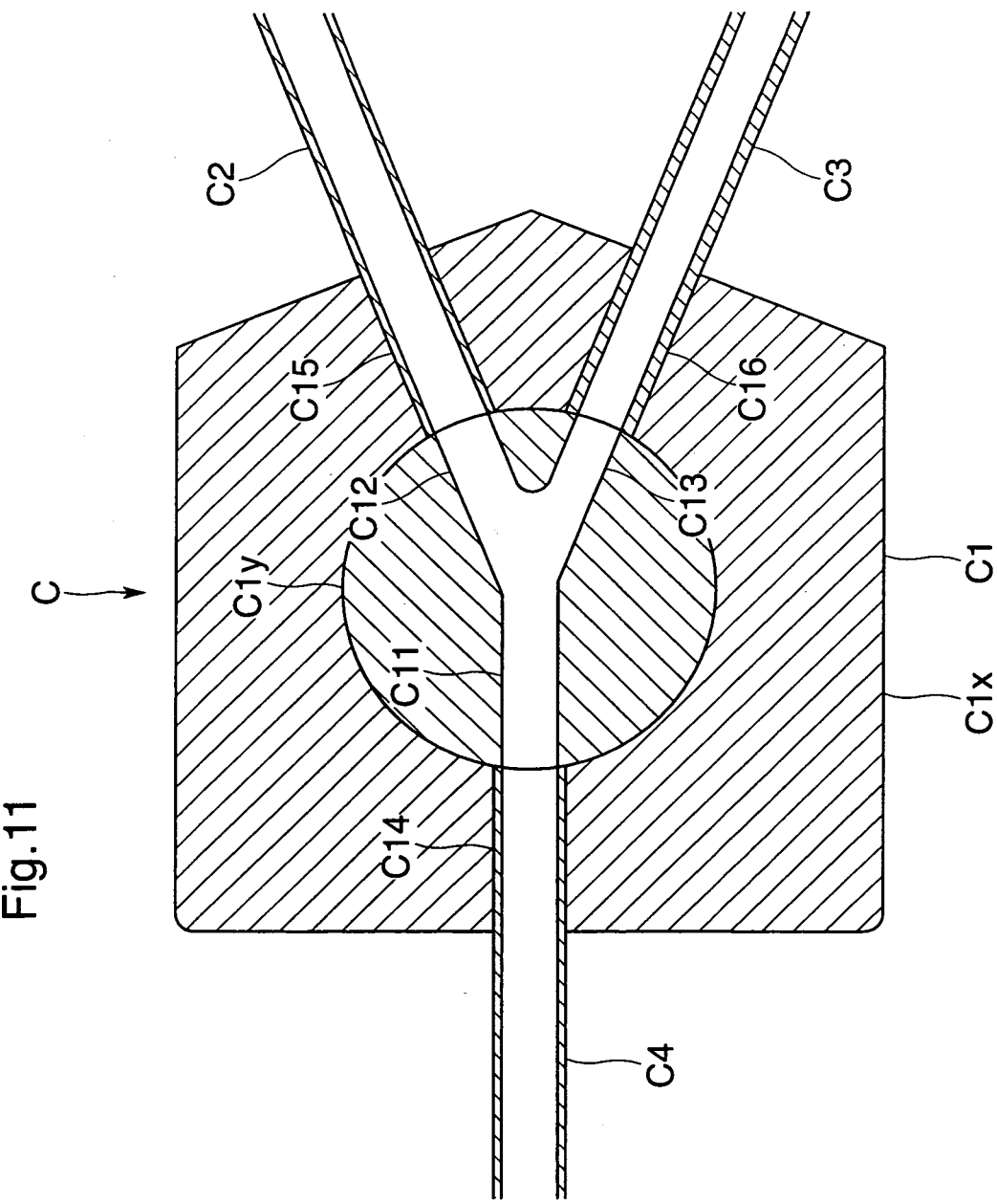
FIG. 11 is a horizontal sectional view of the connection member according to the variation of the present invention.

As illustrated in FIGS. 10 and 11, the flow dividing block C1 in the variation includes, as its elements, a block body C1$x$, and a flow dividing pipe portion C1$y$ detachably attached to the block body C1$x$. The block body C1$x$ and the flow dividing pipe portion C1$y$ are both formed of fluororesin (particularly, polytetrafluoroethylene).

The block body C1$x$ includes a hollow hole C10 provided in a center portion thereof and three insert portions C14, C15, and C16 each extending to the hollow hole C10. In the illustrated example, although the hollow hole C10 vertically penetrates through the block body C1$x$, the hollow hole C10 may be arranged as a hole with a bottom, which does not penetrates therethrough. The three insertion portions C14, C15, and C16 are directed in directions different from one another, open on external different side surfaces of the block body C1$x$, and connect an external circumference thereof to the inside of the hollow hole C10. Inner diameters of the insertion portions C14, C15, and C16 are substantially equal to external diameters of the first tube C2, the second tube C3, and the third tube C4 to be inserted into the insertion portions C14, C15, and C16, respectively. In addition, female screw holes C191 into which screws are fitted are bored in an upper surface (or lower surface) of the block body C1$x$.

The flow dividing pipe portion C1$y$ includes, inside a shaft body that firmly fits into the hollow hole C10 of the block body C1$x$, one inflow passage C11 and two outflow passages C12 and C13. The inflow passage C11, the first outflow passage C12, and the second outflow passage C13 just form a two-way Y-shaped branch in which the outflow passages C12 and C13 branch out from the inflow passage C11 in plan view. When the shaft body of the flow dividing pipe portion C1$y$ is fitted into the hollow hole C1 of the block body C1$x$, each of the inflow passage C11, the first outflow passage C12, and the second outflow passage C13 communicates with corresponding each one of the insertion portions C14, C15, and C16. In addition, the inner diameter of the second outflow passage C13 is made smaller than the inner diameter of the first outflow passage C12. Annular seals (gaskets) C18 are fitted to the shaft body above and below the inflow passage C11 and the outflow passages C12 and C13.

Insertion holes C192 in which screws are inserted are bored in an upper end portion (or a lower end portion) of the shaft body. When the shaft body of the flow dividing pipe portion C1$y$ is fitted into the hollow hole C10 of the block body C1$x$, the insertion holes C192 overlap with the female screw holes C191, respectively. In this state, when screws are individually inserted into the insertion holes C192 and securely screwed into the female screw holes C191, the flow dividing pipe portion C1$y$ can be fixed to the block body C1$x$.

One end of the first tube C2 is connected to the insertion portion C15 that communicates with the first outflow passage C12 of the flow dividing block C1, and the other end thereof is connected to the connection portion Y42 that communicates with the circulation pipe Y11 of the spray nozzle Y1. The inner diameter of the first tube C2 is substantially equal to the inner diameter of the first outflow passage C12.

One end of the second tube C3 is connected to the insertion portion C16 that communicates with the second outflow passage C13 of the flow dividing block C1, and the other end thereof is connected to the connection portion Y43 that communicates with the circulation pipe of the spray nozzle Y2. The inner diameter of the second tube C3 is made smaller relative to the inner diameter of the first tube C2.

One end of the third tube C4 is connected to the insertion portion C14 that communicates with the inflow passage C11 of the flow dividing block C1, and the other end thereof is connected to the lubricant supply port S1 of the lubricant supply device S. The inner diameter of the third tube C4 is substantially equal to the inner diameter of the inflow passage C11.

The lubricant sprayed by the lubricant supply device S flows into the inflow passage C11 of the flow dividing pipe portion C1y of the flow dividing block C1 through the third tube C4, and is split into the two outflow passages C12 and C13. A part of the lubricant that flows into the first outflow passage C12 reaches the circulation pipe Y11 of the spray nozzle Y1 through the first tube C2, and is sprayed from the spray port Y12 toward the inner circumferential surface of the die bore 4 and the tip face of the tip 63 of the lower punch 6. The remaining lubricant that flows into the second outflow passage C13 reaches the circulation pipe of the spray nozzle Y2 through the second tube C3, and is sprayed from the spray port Y22 toward the tip face of the tip 53 of the upper punch 5. As already described, the inner diameters of the second outflow passage C13 and the second tube C3 are smaller than those of the first outflow passage C12 and the first tube C2. As a result, a flow rate of the lubricant that is distributed to the spray nozzle Y2 is smaller than a flow rate of the lubricant that is distributed to the spray nozzle Y1. Consequently, a spray amount of the lubricant sprayed from the spray nozzle Y2 is regulated to become smaller than a spray amount of the lubricant sprayed from the spray nozzle Y1.

Table 2 indicates an experimental result of spraying the lubricant using the flow dividing block C1 according to the present variation. Also, in this experiment, the diameter of the molded article is assumed to be 8 mm, and a target is to obtain the actual measurement spray ratio of 1.4. Tubes each having an external diameter of 4 mm and an internal diameter of 3 mm, and an external diameter of 4 mm and an internal diameter of 2 mm are prepared. These tubes are used as the first tube C2, the second tube C3, and the third tube C4. The flow dividing pipe portion C1y including the inflow passage C11 having an inner diameter of 3 mm, the first outflow passage C12 having an inner diameter of 3 mm, and the second outflow passage C13 having an inner diameter of 2.5 mm is used. The flow dividing block C1 (the block body C1x and the flow dividing pipe portion C1y) and the third tube C4 are common in Examples 5 to 9, and an inner diameter of the third tube C4 is 3 mm. In contrast, an inner diameter of the first tube C2 is 3 mm in Examples 5 to 8, and 2 mm only in Example 9. In addition, an inner diameter of the second tube C3 is 3 mm in Examples 5 and 6, and 2 mm in Examples 7 to 9. This means that the inner diameters of the first tube C2 and the second tube C3 are equal to each other in Examples 5, 6, and 9. The connection member C, the third tube C4, or the first and second tubes C2 and C3 are grounded in Examples 6 and 8. However, the connection member C is not grounded in Examples 5, 7, and 9.

Measurements are also conducted five times individually in Examples 5 to 9 on the amounts of the lubricant supplied to the downward spray portion Y12 and the amounts of the lubricant supplied to the upward spray portion Y22 for a certain period of time (one hour).

The lubricant supply device S used in the experiment is "ELS-P1-3" of Nisshin Engineering Inc. The lubricant supply device S provided with a filling roll having a groove width of 2.5 mm and a groove depth of 2.5 mm is used. The experiment is conducted at a revolution speed of 6 rpm, while an amount of the lubricant to be sprayed is set at 120 to 130 g/h. The experiment is conducted under the environment with a room temperature of 20 to 25° C. and a humidity of 35 to 45%.

TABLE 2

|  | Example 5 | Example 6 | Example 7 | Example 8 | Example 9 |
|---|---|---|---|---|---|
| Actual measurement spray ratio (first time) | 1.20 | 0.78 | 1.65 | 1.43 | 1.33 |
| Actual measurement spray ratio (second time) | 1.24 | 0.82 | 1.58 | 1.50 | 1.33 |
| Actual measurement spray ratio (third time) | 1.17 | 0.75 | 1.79 | 1.35 | 1.22 |
| Actual measurement spray ratio (fourth time) | 1.22 | 0.80 | 2.04 | 1.33 | 1.41 |
| Actual measurement spray ratio (fifth time) | 1.22 | 0.76 | 1.86 | 1.55 | 1.21 |
| Average | 1.21 | 0.78 | 1.78 | 1.43 | 1.30 |
| Maximum | 1.24 | 0.82 | 2.04 | 1.55 | 1.41 |
| Minimum | 1.17 | 0.75 | 1.58 | 1.33 | 1.21 |
| Range | 0.07 | 0.07 | 0.47 | 0.22 | 0.20 |
| Standard deviation | 0.03 | 0.03 | 0.18 | 0.09 | 0.08 |
| Coefficient of variation | 2.19 | 3.66 | 10.24 | 6.60 | 6.46 |

As indicated in Table 2, in the present variation, the inner diameter of the second outflow passage C13 of the flow dividing pipe portion C1y is smaller than that of the first outflow passage C12. For this reason, except for Example 6, the actual measurement spray ratio is sufficiently larger than 1. This means that there is a clear difference between the amount of the lubricant that flows toward the downward spray portion Y12 and the amount of the lubricant that flows toward the upward spray portion Y22.

When Examples 7 and 8 are compared with Examples 5 and 9, the actual measurement spray ratio tends to become larger in the case where the inner diameter of the second tube C3 is made smaller than the inner diameter of the first tube C2 than in the case where the inner diameters of the two tubes C2 and C3 are made equal to each other. Further, when Example 5 is compared with Example 9, it is found that the actual measurement spray ratio is larger in Example 9. This means that a better effect is presented in the case where the inner diameter of the second tube C3 is 2 mm than in the case where the same is 3 mm. This suggests that, in the relation between the inner diameters of the first tube C2 and the second tube C3, and the amounts of the lubricant (pressurized air including the lubricant) that flow in these tubes C2 and C3, the effect decreases in the case where the diameters of the tubes C2 and C3 are too large relative to the flow rate of the lubricant.

Further, it is found, from Examples 6 and 8, that variations in the actual measurement spray ratio are suppressed when the first tube C2 and the second tube C3 are grounded.

In the foregoing embodiment, the inner diameter of the outflow passage C13 of the flow dividing pipe portion C1y is different from the inner diameter of the second tube C3. However, by arranging these diameters equal to each other, the actual measurement spray ratio comes closer to the ideal value (i.e., 1.4 when the diameter of the molded article is 8 mm). The actual measurement spray ratio also comes closer to the ideal value by arranging the inner diameter of the circulation pipe Y11 of the spray nozzle Y1 equal to the inner diameter of the second tube C3, and the inner diameter of the spray pipe of the spray nozzle Y2 equal to the inner diameter of the third tube C4.

According to the present variation, the powder compression molding machine is configured to include the table 31 including the die bore 4 vertically penetrating therethrough; a pair of a lower punch 6 and an upper punch 5 individually having tips 63 and 53 thereof that slide in the die bore 4 and compress a powdery material filled in the die bore 4; a downward spray portion Y12 that sprays a lubricant toward an inner circumferential surface of the die bore 4 and a tip face of the tip 63 of the lower punch 6; an upward spray portion Y22 that sprays the lubricant toward a tip face of the tip 53 of the upper punch 5; a first lubricant flow passage (the first outflow passage C12, the first tube C2 and the circulation pipe Y11 of the spray nozzle Y1) through which the lubricant supplied from a lubricant supply device S externally provided is fed to the downward spray portion Y12; and a second lubricant flow passage (the second outflow passage C13, the second tube C3 and the circulation pipe of the spray nozzle Y2) through which the lubricant supplied from the lubricant supply device S externally provided is fed to the upward spray portion Y22, the second lubricant flow passage being provided, at least partially, with a small-diameter region (the second outflow passage C13 and/or the second tube C3) in which an inner diameter thereof is made smaller than that of the first lubricant flow passage. Accordingly, it is possible to reduce the amount of the lubricant to be fed to the upward spray portion Y22 smaller than that to be fed to the downward spray portion Y12, and spray a necessary and sufficient amount of the lubricant from the upward spray portion Y22. Since the lubricant that can not stick to the tip 53 of the upper punch 5 is prevented from being sprayed from the upward spray portion Y22 needlessly, a purging amount of the lubricant can be reduced.

The powder compression molding machine includes, as its elements, a molding machine body 0 provided therein with the table 31, the lower punch 6, the upper punch 5, the downward spray portion Y12, and the upward spray portion Y22; and a connection member C that connects the molding machine body 0 and the lubricant supply device S provided externally to each other and causes the lubricant to flow therebetween. The connection member C includes a branching having a first flow passage (the first outflow passage C12 and the first tube C2) for circulating the lubricant toward the downward spray portion Y12 and a second flow passage (the second outflow passage C13 and the second tube C3) for circulating the lubricant toward the upward spray portion Y22, and the second flow passage is provided with the small-diameter region (the second outflow passage C13 and/or the second tube C3). Accordingly, no particular modifications are necessary to the molding machine body 0 and the lubricant supply device S.

The connection member C is provided with a flow dividing block C1 including one inflow passage C11 and two outflow passages C12 and C13, and three tubes C4, C2, and C3 that are respectively attached to the inflow passage C11 and the outflow passages C12 and C13 of the flow dividing block C1. The second tube C3 attached to one C13 of the outflow passages is provided with the small-diameter region in which the inner diameter thereof is made smaller than that of the first tube C2 attached to the other C12 of the outflow passages. Accordingly, it is easy to secure a certain length or more of the small-diameter region. As a result, it is possible to sufficiently differentiate the amount of the lubricant to be fed to the downward spray portion Y12 from the amount of the lubricant to be fed to the upward spray portion Y22.

Then, the flow dividing block C1 includes, as its elements, a block body C1x and a flow dividing pipe portion C1y that is detachably attached to the block body C1x. A pipe line (the first outflow passage C12) that communicates with the downward spray portion Y12 and a pipe line (the second outflow passage C13) that communicates with the upward spray portion Y22 are formed in the flow dividing pipe portion C1y. At the same time, the pipe line that communicates with the upward spray portion Y22 is provided with the small-diameter region in which the inner diameter thereof is made smaller than that of the pipe line that communicates with the downward spray portion Y12. With this arrangement, the inner diameter of the small-diameter region can be changed by replacing the flow dividing pipe portion C1y. As a result, it becomes easier to adjust a ratio of the amount of the lubricant to be fed to the upward spray portion Y22 to the amount of the lubricant to be fed to the downward spray portion Y12 by means of replacing the flow dividing pipe portion C1y.

Specific configurations of other portions may be variously modified without departing from the spirit of the invention.

What is claimed is:

1. A powder compression molding machine comprising:
 a table having a die bore vertically penetrating therethrough;
 a pair of a lower punch and an upper punch individually having tips thereof that slide in the die bore and compress a powdery material tilled in the die bore;
 a downward spray portion that sprays a lubricant toward an inner circumferential surface of the die bore and a tip face of the tip of the lower punch;
 an upward spray portion that sprays the lubricant toward a tip face of the tip of the upper punch;
 a first lubricant flow passage through which the lubricant supplied from a lubricant supply device provided externally is fed to the downward spray portion;
 a second lubricant flow passage through which the lubricant supplied from the lubricant supply device provided externally is fed to the upward spray portion, the second lubricant flow passage being provided, at least partially, with a small-diameter region in which an inner diameter thereof is made smaller than that of the first lubricant flow passage; and
 an inflow passage connected to the lubricant supply device, the first lubricant flow passage and the second lubricant flow passage being independently connected to the inflow passage.

2. The powder compression molding machine according to claim 1, further comprising: a molding machine body provided therein with the table, the lower punch, the upper punch, the downward spray portion, and the upward spray portion; and a connection member that connects the molding machine body and the lubricant supply device provided externally to each other and causes the lubricant to flow therebetween, wherein the connection member includes a branching having a first flow passage for circulating the lubricant toward the downward spray portion and a second flow passage for circulating the lubricant toward the upward spray portion, and the second flow passage is provided with the small-diameter region.

3. The powder compression molding machine according to claim 2, wherein the connection member includes a flow dividing block having one inflow passage and two outflow passages, and three tubes that are respectively attached to the inflow passage and the outflow passages of the flow dividing block, and the tube being attached to one of the outflow passages is provided with the small-diameter region in which the inner diameter thereof is made smaller than that of the tube being attached to other of the outflow passages.

4. The powder compression molding machine according to claim 3, wherein the flow dividing block includes a block body and a flow dividing pipe portion being detachably attached to the block body, a pipe line that communicates with the downward spray portion and a pipe line that communicates with the upward spray portion are formed in the flow dividing pipe portion, and the pipe line that communicates with the upward spray portion is provided with the small-diameter region in which the inner diameter thereof is made smaller than that of the pipe line that communicates with the downward spray portion.

5. The powder compression molding machine according to claim 2, wherein a grounding member is attached to the connection member, and the connection member is grounded.

6. The powder compression molding machine according to claim 3, wherein a grounding member is attached to the connection member, and the connection member is grounded.

7. The powder compression molding machine according to claim 1, wherein the first lubricant flow passage and the second lubricant flow passage are configured such that a flow rate of the lubricant that is distributed to the upward spray portion is smaller than a flow rate of the lubricant that is distributed to the downward spray portion.

8. The powder compression molding machine according to claim 1, further comprising a connection member which connects directly with each of the lubricant supply device, the first lubricant flow passage and the second lubricant flow passage.

9. The powder compression molding machine according to claim 1, wherein the lubricant supply device, the first lubricant flow passage and the second lubricant flow passage connect at a common point.

10. The powder compression molding machine according to claim 2, wherein the second lubricant flow passage and the first lubricant flow passage extend independently from the connection member.

11. The powder compression molding machine according to claim 1, wherein the smaller-diameter region of the second lubricant flow passage is other than in series with the first lubricant flow passage.

12. The powder compression molding machine according to claim 1, wherein the first lubricant flow passage and the second lubricant flow passage are configured such that a flow rate of the lubricant passing through the small diameter portion of the second lubricant flow passage to the upward spray portion is less than a flow rate of the lubricant passing through the first lubricant flow passage.

13. The powder compression molding machine according to claim 8, wherein the connection member comprises a Y-branch configured such that the lubricant supply device is connected to a first branch, the first lubricant flow passage is connected to a second branch, and the second lubricant flow passage is connected to a third branch.

14. The powder compression molding machine according to claim 13, wherein the third branch has an inner diameter less than an inner diameter of the second branch.

* * * * *

UNITED STATES PATENT AND TRADEMARK OFFICE
CERTIFICATE OF CORRECTION

PATENT NO.         : 8,425,215 B2  
APPLICATION NO.    : 13/137968  
DATED              : April 23, 2013  
INVENTOR(S)        : Yoshitsugu Oneda et al.

It is certified that error appears in the above-identified patent and that said Letters Patent is hereby corrected as shown below:

Title Page, item [75] Inventor: should be as follows:

Kunihiko TSUTSUI, Kyoto (JP)

Signed and Sealed this  
Second Day of July, 2013

Teresa Stanek Rea  
*Acting Director of the United States Patent and Trademark Office*